(12) United States Patent
Ni et al.

(10) Patent No.: US 12,373,986 B2
(45) Date of Patent: Jul. 29, 2025

(54) SHADING CALIBRATION FOR RADIAL SENSOR LENSES

(71) Applicant: NVIDIA Corporation, Santa Clara, CA (US)

(72) Inventors: Yongshen Ni, San Jose, CA (US); Eric Dujardin, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 55 days.

(21) Appl. No.: 18/165,120

(22) Filed: Feb. 6, 2023

(65) Prior Publication Data
US 2024/0265575 A1 Aug. 8, 2024

(51) Int. Cl.
H04N 25/61 (2023.01)
G06T 7/80 (2017.01)
H04N 17/00 (2006.01)

(52) U.S. Cl.
CPC ............ *G06T 7/80* (2017.01); *H04N 17/002* (2013.01); *H04N 25/61* (2023.01)

(58) Field of Classification Search
CPC ......... G06T 7/80; H04N 17/002; H04N 25/61
See application file for complete search history.

(56) References Cited

U.S. PATENT DOCUMENTS

| 9,451,187 | B2 | 9/2016 | Cohen et al. | |
|---|---|---|---|---|
| 10,885,698 | B2 | 1/2021 | Muthler et al. | |
| 2004/0257454 | A1* | 12/2004 | Pinto | H04N 25/67 348/222.1 |
| 2009/0268053 | A1* | 10/2009 | Wang | H04N 25/61 348/229.1 |
| 2010/0265358 | A1* | 10/2010 | Cabral | H04N 25/61 348/E9.037 |
| 2010/0266201 | A1* | 10/2010 | Cabral | H04N 25/61 382/167 |

(Continued)

OTHER PUBLICATIONS

Gardner, C, I., "Validity of the Cosine-Fourth-Power Law of Illumination", U. S. Department of Commerce National Bureau of Standards, pp. 213-219 (Sep. 1947).

(Continued)

*Primary Examiner* — Twyler L Haskins
*Assistant Examiner* — Surafel Yilmakassaye
(74) *Attorney, Agent, or Firm* — SHOOK, HARDY & BACON L.L.P.

(57) ABSTRACT

In various examples, systems and methods for calibration for sensor lens shading using non-radial correction of residual radial shading error are provided. In some embodiments, a calibration flow includes computation of calibration parameters corresponding to radial lens shading correction, and computation of calibration parameters corresponding to non-radial lens shading correction. A lens shading profile may be computed that defines a gain mapping of lens shading effect appearing in an image frame of calibration sensor data. Parameters for radial lens shading correction may be computed from the lens shading profile, and parameters for non-radial lens shading correction may be computed based a residual shading profile generated from the radial lens shading correction. Calibration parameters for radial and non-radial lens shading correction may be used to calibrate sensor data captured by an image sensor module to correct for lens shading.

15 Claims, 17 Drawing Sheets

(56) References Cited

U.S. PATENT DOCUMENTS

| | | | |
|---|---|---|---|
| 2014/0028839 | A1 | 1/2014 | Ishibashi |
| 2014/0293066 | A1 | 10/2014 | Cabral et al. |
| 2015/0130972 | A1* | 5/2015 | Liu ................. H04N 25/61 |
| | | | 348/251 |
| 2015/0365661 | A1 | 12/2015 | Hayashi et al. |
| 2019/0001975 | A1 | 1/2019 | Liu et al. |
| 2019/0034706 | A1* | 1/2019 | el Kaliouby ....... H04N 21/4223 |
| 2022/0270291 | A1 | 8/2022 | Nguyen et al. |
| 2023/0351625 | A1 | 11/2023 | Hughes et al. |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Umbach, D., and Jones, N, K., "A Few Methods for Fitting Circles to Data", IEEE Transactions on Instrumentation and Measurement, pp. 1-5 (2000).

Willson, G, R., and Shafer, A, S., "What is the center of the image?", J. Opt. Soc. Am. A/vol. 11, No. 11, pp. 2946-2955 (Nov. 1994).

Co-pending U.S. Appl. No. 18/165,159, entitled "Lens Shading Using Non-Radial Image Correction," filed Feb. 6, 2023.

Non-Final Office Action received for U.S. Appl. No. 18/165,159, mailed on Oct. 1, 2024, 23 pages.

Notice of Allowance received for U.S. Appl. No. 18/165,159, mailed on Feb. 12, 2025, 5 pages.

* cited by examiner

SHADING CALIBRATION FOR RADIAL SENSOR LENSES

CROSS-REFERENCE TO RELATED APPLICATIONS

This patent application is related to U.S. Patent Application Ser. No. 18/165,159, titled "LENS SHADING USING NON-RADIAL IMAGE CORRECTION," filed on Feb. 6, 2023, which is incorporated herein by reference in its entirety.

BACKGROUND

Surround view systems (SVS) provide occupants of an ego-machine with a visualization of an area surrounding the ego-machine. For example, a SVS provides the driver and/or other occupants with the ability to view the surrounding area, including blind spots where a line of sight is occluded by a portion of the ego-machine and/or other objects in the environment, without the need to reposition (e.g., turn their head, get up from their seat, lean a certain direction, etc.). This visualization may assist and facilitate a variety of driving maneuvers, such as smoothly entering or exiting a parking spot without hitting objects such as a road curb, pedestrians, or other vehicles or dynamic objects. More and more vehicles, especially luxury brands and new models, are being produced with surround view capability.

A vignette is a visual effect that may appear in a frame of image data where one or more image qualities vanish towards the periphery of the image (e.g., a reduction in brightness or saturation). While vignette visual effects are often introduced in digital photography to render an artistic effect, in industrial applications, a vignette visual effect is more often an indication of an imperfection in the design or production of a lens, or a mismatch between a lens and the size of the image sensor. Lens vignette, also referred to as lens shading, may be particularly evident in an image taken with a wide-angle/short focal length lens, such as a fisheye lens, for example.

Image sensors with wide-angle lenses are often used with autonomous machines, such as autonomous and semi-autonomous vehicles, to collect SVS sensor data. SVS sensor data may capture the surrounding environment of the autonomous machines to support operations such as, but not limited to, hazard detection, navigation and/or path planning. In such applications, image frames from multiple image sensors may be joined together into a composite image using a stitching algorithm to produce, for example, a 360-degree surround view image for evaluation by an artificial intelligence model or other logic. However, the attenuation of image features at the periphery of captured image frames due to lens shading greatly complicates the task of the stitching algorithm matching features from different image frames to produce composite images free from artifacts.

The use of high order polynomials to represent image distortions is one example of a technology that can be applied across an image plane to attempt to overcome and correct the impact of lens shading and lens imperfections. However, the high order polynomials are computationally expensive and are complicated to execute on hardware of fixed precision. The use of patch array surfaces (e.g., Bezier surfaces) is another example of an existing image correction technique to address various lens effects including lens shading. For example, from image data received from an optical image sensor, a Bezier patch array may be used with the image data to produce corrected image data that mitigates a variety of effects including lens shading and lens imperfections, for example. However, the limits of Bezier lens shading are evident in applications where lens imperfections are more pronounced due to the grade of quality of less expensive lenses used for production camera modules, the relatively small size of the sensor used for production camera modules, and/or for applications where the camera modules use very wide-angle lenses (e.g., such as fisheye lenses) where the lens shading effect is inherently more extreme. Specifically, patch boundaries artifacts may be noticeably prominent between neighboring patches of the Bezier patch array, for example, due to a lack of valid data samples close to image edges, and/or due to the mismatch between the shape of the Bezier patch array and circular images produced by very wide-angle lenses such as fisheye lenses.

SUMMARY

Embodiments of the present disclosure relate to calibration for sensor lens shading using non-radial correction of residual radial shading error. Systems and methods are disclosed that reduce the effects of lens shading present in sensor data comprising captured image frames.

In contrast to conventional systems, such as those described above, the systems and methods presented in this disclosure may provide for a calibration flow that individually evaluates symmetrical and non-symmetrical components of the lens shading effect. Symmetrical components of a lens shading effect are those that occur uniformly around a periphery of a circle centered at an optical center of the image frame. Non-symmetrical components are components of the lens shading effect that do not follow a pattern of uniformly appearing around a periphery of a circle centered at the optical center of the image frame. In some embodiments the symmetrical components of a lens shading effect are first addressed using a radial lens shading correction based on a radial transfer function. A non-radial lens shading correction may be computed and applied to address residual lens shading appearing in an image frame after application of the radial lens shading correction.

The calibration flow to calibrate an image sensor may include the computation of a first set of calibration parameters corresponding to radial lens shading correction, and the computation of a second set of calibration parameters corresponding to non-radial lens shading correction. In some embodiments, to generate the calibration parameters, a lens shading profile may be computed that defines a gain mapping of the lens shading effect appearing in an image frame of a calibration image captured by the image sensor, such as a flat-field image. The lens shading profile may comprise or otherwise represent a map of pixels corresponding to the pixels of the image frame, where the value of a pixel in the lens shading profile represents the gain of the lens shading affect occurring in the corresponding pixel of the image frame. Parameters of a radial transfer function to implement radial lens shading correction may be computed using an ellipse mask for the lens shading profile and building radial reference data for multiple offset directional radial lines radiating from an optical center of the lens shading profile. Symmetrical components of lens shading may be reduced by applying the radial transfer function to the calibration image. However, the resulting image frame may comprise a residual shading profile where lens shading distortion may remain in the form of non-symmetrical components of lens shading. To address the residual non-symmetrical components of lens shading, non-radial lens shading correction parameters may be computed using the residual shading profile. Non-radial lens shading correction may be applied to the residual shading profile to produce a calibrated image frame, and one or more uniformity metrics may be measured from the calibrated image frame quantify the effectiveness of the calibration flow.

In production environments, the previously determined radial and non-radial calibration parameters may be programmed into an image processing module so that sensor data captured by an image sensor module can be corrected for lens shading. The resulting image after the application of radial and non-radial lens shading correction to an original image may comprise a relatively flat gain profile with respect to lens shading, substantially free of fading caused by the lens of the image sensor module or other factors.

BRIEF DESCRIPTION OF THE DRAWINGS

The present systems and methods for calibration for sensor lens shading using non-radial correction of residual radial shading error are described in detail below with reference to the attached drawing figures, wherein.

DETAILED DESCRIPTION

Figure 1:
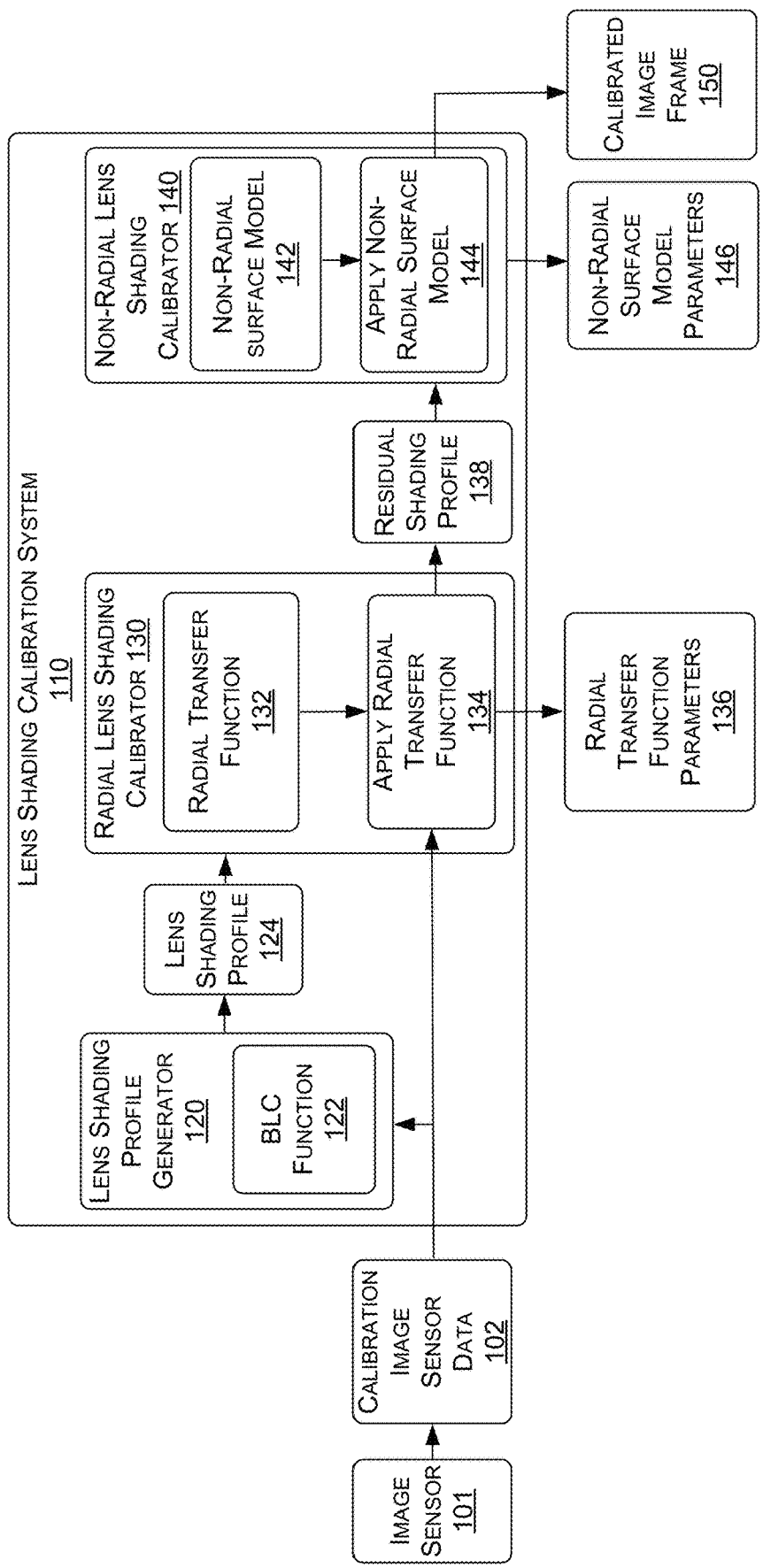
FIG. 1 is an illustration of an example data flow diagram for a lens shading calibration system, in accordance with some embodiments of the present disclosure.

Systems and methods are disclosed related to calibration for sensor lens shading using non-radial correction of residual radial shading error. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to calibration of image sensor data used for image-based operations of autonomous machines and other technologies, this is not intended to be limiting, and the systems and methods described herein may be used in augmented reality, virtual reality, mixed reality, robotics, security and surveillance, autonomous or semi-autonomous machine applications, and/or any other technology spaces where calibrated image sensor data may be used.

The systems and methods presented in this disclosure include embodiments that provide for, among other embodiments, calibration process(es) to correct for lens shading error introduced into sensor data by camera module lens elements or other factors. In contrast to existing lens shading correction technologies, the systems and methods presented in this disclosure may provide a calibration flow that individually evaluates and addresses symmetrical and non-symmetrical components of the lens shading effect. Symmetrical components of a lens shading effect are those that occur generally in a uniform pattern around a periphery of a circle centered at an optical center of the image frame. These components may therefore be said to have a radial symmetry because they may appear at, or be modeled to appear at, a generally constant radius around the optical center. Non-symmetrical components are components of the lens shading effect that do not follow a pattern of uniformly around a periphery of a circle centered at the optical center of the image frame.

As discussed in greater detail below, some embodiments first address the symmetrical components of a lens shading effect (e.g., which may be produced by an image sensor lens) using a radial lens shading correction. Although symmetrical components of the lens shading effect are likely to be the dominant contributor to image distortion, once removed, observable residual lens shading may still remain in an image frame, for example, due to imperfections in the design or fabrication of the lens. Accordingly, a non-radial lens shading correction (e.g., a Bezier surface-based lens shading correction) may be computed and applied to address such residual lens shading that appears in an image frame after application of radial lens shading correction. The resulting image after the application of radial and non-radial lens shading correction to an original image may comprise a relatively flat gain profile with respect to lens shading, substantially free of fading caused by the lens of the image sensor module or other factors.

In some embodiments, the calibration of an image sensor (e.g., a camera module) to mitigate lens shading may include the computation of a first set of calibration parameters corresponding to radial lens shading correction, and the computation of a second set of calibration parameters corresponding to non-radial lens shading correction. These calibration parameters may be programmed into an image processing module coupled to the image sensor module so that sensor data captured by the image sensor module can be corrected for lens shading.

In some embodiments, a calibration process may include receiving sensor data comprising an image frame of a calibration image, such as a flat-field image. For example, a flat-field may be obtained by imaging or simulating a uniformly-illuminated screen to produce an image of uniform color and brightness across the image frame. The flat-field image may be illuminated using a known light source, for example using a D65 or other color standard light. In some embodiments, sensor data comprising a flat-field image may comprise one or more values for each pixel, such as the pixel gain, the pixel dark current (the amount of signal given out by the sensor detector when there is no incident light), and/or other values. Black level correction (BLC) may be applied to the image frame to linearize or otherwise adjust variations in the pixel dark current values. In some embodiments, a lens shading profile may be computed using the black level corrected image frame.

The lens shading profile may comprise or otherwise represent a map of pixels corresponding to the pixels of the image frame, where the value of a pixel in the lens shading profile represents the gain of the lens shading affect occurring in the corresponding pixel of the image frame. In some embodiments, the lens shading profile essentially defines an inverse gain mapping of the lens shading effect appearing in the image frame. That is, high gain values may appear at the periphery of the lens shading profile where the lens shading effect causes the greatest fading of image features, and relatively low gain values may appear toward the middle of the lens shading profile where the lens shading effect causes the least fading of image features. In some embodiments, the lens shading profile may comprise one or more gain values per pixel, corresponding to one or more color channels (e.g., R, Gr, Gb and G color channels).

Computing the radial lens shading correction parameters may include computing an ellipse mask for the lens shading profile and building radial reference data (e.g., a radial lens shading look up table) for multiple offset directional radial lines radiating from an optical center of the lens shading profile. For example, in some embodiments, six (6) radial lines may be used that converge at the optical center of the lens shading profile and that are offset from each other by 60 degrees.

There are several available optical center estimation algorithms that may be applied to determine the optical center of an image. For example, in one embodiment, the optical center of the lens shading profile may be determined by finding the brightest point of each row and each column (which for the lens shading profile may be where the lens shading effect has the lowest gain), fitting a first line through the brightest points of each row, and fitting a second line through the brightest points of each column. The intersection of the first and second lines defines the optical center. In another embodiment, the optical center of the lens shading profile may be determined by computing a radiometric falloff. This embodiment would include finding the brightest point of each row and each column (which for the lens shading profile may be where the lens shading effect has the lowest gain) and estimating a two-dimensional (2D) polynomial regression from those points to characterize a lens shading surface where the highest point of the surface defines the optical center.

With the optical center of the lens shading profile determined, a plurality of radial lines that extend from the optical center may be defined across the lens shading profile. Along each radial line, one or more control points (e.g., 4 control points) may be established at set distances from the optical center. The control points may be arranged such that connecting corresponding control points along each radial line forms an ellipse (e.g., a circle) of equal intensity drop around the optical center. For each control point, the intensity drop (e.g., as compared to the intensity at the optical center) caused by the increase in lens shading gain may be computed to determine a slope corresponding to the rate of change of lens shading at that pixel of the lens shading profile.

In some embodiments, a cubic Hermite spline may be computed for the individual radial lines using the control points by fitting the cubic Hermite spline over the data corresponding to the control points to model the change in lens shading. For example, a spline function defined by piecewise third-degree polynomials may be used to model the change in lens shading. In some embodiments, more control points may be defined closer together along the radial lines where the lens shading gain increases more rapidly (e.g., towards the image periphery) than towards the optical center. The splines of the radial lines may be converted to radial transfer function parameters for a radial transfer function. In some such embodiments, the radial transfer function may be a representation of the inverse of the symmetrical component of lens shading in the original image frame so that when the radial transfer function is applied to the original image frames, the effect of the symmetrical component of lens shading is removed from the image frame.

The radial transfer function parameters may be stored to a memory (e.g., using a radial transfer function parameter look up table). In some embodiments, the radial transfer function may be derived by averaging the spline function models across the plurality of radial lines. Moreover, in some embodiments, other curve fitting models may be used to fit curves to the control points along the radial lines. For example, in some embodiments, polynomial interpolation may be used, with polynomial coefficients defining the radial transfer function parameters for a radial transfer function. In some embodiments, radial transfer function parameters may be computed for one or more channels (e.g., R, Gr, Gb and G color channels) of the pixels of the lens shading profile.

When the radial transfer function is applied to the calibration image, the resulting image frame may comprise a residual shading image frame, which may be referred to as a residual shading profile. The residual shading profile may comprise a version of the original calibration image frame where effects of the symmetrical component of lens shading are removed. That said, residual lens shading distortion may still be present in the form of the non-symmetrical components of lens shading. In some embodiments, the residual shading profile may comprise one or more color channel channels (e.g., R, Gr, Gb and G color channels).

To address the residual non-symmetrical components of lens shading, non-radial surface model parameters may be computed from the residual shading profile. For example, a rectangular patch array (e.g., a Bezier patch array) may be used to define a non-radial surface model that comprises a plurality of rectangular patch regions, each patch region comprising a plurality of control points arranged in a grid. A patch array may be determined and used for calibrating lens shading correction for one or more color channels of the residual shading profile.

As an example, in one embodiments, a Bezier patch array may comprise a 10×10 array of control points. The Bezier patch array may also be divided into a 3×3 grid of patch regions such that each region defines a 4×4 array of control points. The resulting rows and/or columns of control points need not be uniformly spaced. Bezier patch regions may be coupled together along boundaries or edges. The edges of Bezier patch regions may be adjustable or configurable. The control points may thus define the shape of Bezier patch regions. Some control points may be on boundaries of Bezier patch regions and thus may be shared between Bezier patches.

For example, in some embodiments, one or more control points of the Bezier patch array may share the internal boundaries between patch regions. The location of control points on patch region boundaries ensures that the patch regions will join seamlessly to form a continuous Bezier surface. The boundaries may be selected to correspond to certain areas of the camera module lens that are particularly uneven. The boundaries between patch regions may be variably spaced based at least on imperfections in the surface of the image sensor of the camera module that contribute to non-symmetrical lens shading. For example, boundaries may be moved around according to the sensor surface so that areas where the sensor surface is substantially uneven may have more control points to better reflect the shape of the sensor surface.

The control points of the patch array may be used to fit a non-radial lens shading model (e.g., a non-radial surface model) that corrects residual lens shading error remaining after the radial transfer function is applied. The control points of the patch array may define a Bezier surface that comprises a reciprocal surface with respect to non-symmetrical lens shading, such that when the pixels values of the reciprocal surface are multiplied by the pixel values in the residual shading profile, the values are flattened out so that the original image frame of the calibration image (e.g., the flat frame image) is obtained without symmetrical or non-symmetrical lens shading. In one embodiment, the control points of the Bezier patch array are control points for a bi-cubic Bezier surface. The determination of parameters for a non-radial surface model based on a Bezier surface may be determined by a series of interpolations with cubic Bezier coefficients defining non-radial surface model parameters.

In some embodiments, the non-radial lens shading correction may be applied to the residual shading profile to produce a calibrated image frame, and one or more uniformity metrics (e.g., values) used to quantify the effectiveness of the calibration flow. For example, in some embodiments, the uniformity of the calibrated image frame (e.g., with respect to one or more color channels) may be compared to the uniformity of the flat-field image used as input to the calibration flow. If the uniformity values are assessed to be within an acceptance criteria, then the first set of calibration parameters (corresponding to radial lens shading correction parameters), and the second set of calibration parameters (corresponding to non-radial lens shading correction parameters), may be stored as a set of lens shading calibration parameters that may be used by applications and/or processes to remove lens shading from captured image frames. If the uniformity values are not within the acceptance criteria, then the calibration may be adjusted accordingly. For example, additional control points may be added to one or both of the radial lens shading correction calibration segment and the non-radial lens shading correction calibration segment. As an example, if the uniformity values (according to the particular metric(s)) used to evaluate the calibrated image frame detects residual symmetric lens shading artifacts in the calibrated image frame (e.g., exceeding an acceptance criteria) then addition control points may be added to the process of deriving the radial transfer function. If the uniformity metric used to evaluate the calibrated image frame detects residual non-symmetric lens shading artifacts in the calibrated image frame (e.g., exceeding an acceptance criteria) then addition control points may be added to the Bezier patch array to derive the Bezier surface.

As previously mentioned, the set of lens shading calibration parameters computed by the calibration flow may be stored and/or used by applications and/or processes to remove lens shading from captured image frames. For example, production autonomous machines comprising a camera module calibrated by the calibration flow may receive sensor data from the camera module comprising an image frame representing a scene around the autonomous machine. Due to factors such as design or fabrication imperfections with respect to either the lens and/or sensor of the camera module, the raw sensor data generated by the camera module may include lens shading errors such as a vignette effect. An image processing application receiving the raw sensor data may load the radial transfer function parameters into a radial lens shading correction model (e.g., a radial transfer function) to adjust the model to remove the effects of the symmetrical component of lens shading from the image frame. The image processing application may load the non-radial surface model parameters into a model for non-radial lens shading correction to adjust the model to remove the effects of the non-symmetrical component of lens shading from the image frame. The resulting calibrated image frame is corrected to remove both symmetrical and non-symmetrical lens shading correction and may be used as input for other processes (e.g., a machine learning model, stitching application, and/or other purposes) that is more accurate than the original camera image from the raw sensor data. These embodiments therefore provide a technique by which sensor data generated by a less expensive production grade camera module can be corrected to obtain a lens shading free image frame of the same quality as would be produced by relatively more expensive high-precision grade camera modules.

In some embodiments, the calibration flow may be performed using a selected standardized camera module to obtain a standard set of lens shading calibration parameters that may be programed into a plurality of production autonomous machines for use with production camera modules of the same or similar type as the standardized camera module. In other embodiments, production camera modules may be individually calibrated using the above described calibration flow to obtain a custom set of lens shading calibration parameters particularly computed for that camera module.

In some embodiments, one or more components of the calibration flow may be implemented using one or more processors and/or on a cloud computing platform. The various functions of the calibration flow, such as computing radial and non-radial lens shading corrections and their corresponding parameters, and/or applying lens shading calibration parameters to raw sensor data image frames to produce calibrated images, may be executed on one or more processors such as a central processing unit coupled to memory and may operate in conjunction at least in part with one or more graphics processing units. The graphics processing units may be programmed, for example, to execute kernels to implement one or more functions that use the calibrated image frames to support operations such as, but not limited to, hazard detection, navigation and/or path planning.

While embodiments presented in this disclosure may be implemented in the context of autonomous machines such as, but not limited to, autonomous vehicles, semi-autonomous vehicles, piloted and un-piloted robots or robotic platforms, warehouse vehicles, off-road vehicles, vehicles coupled to one or more trailers, aircraft, spacecraft, boats, shuttles, emergency response vehicles, construction vehicles, underwater craft, drones, and/or other vehicle types, other embodiments other embodiments may include determining lens shading calibration parameters for other sensors that capture image frames of other spaces, such as rooms, warehouses, gymnasiums, containers, and/or studios.

With reference to FIG. 1, FIG. 1 is an example data flow diagram for a lens shading calibration system 110, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

As shown in FIG. 1, the lens shading calibration system 110 may comprise a lens shading profile generator 120, and calibration functions that include radial lens shading calibrator 130 and non-radial lens shading calibrator 140. The lens shading calibration system 110 may receive calibration image sensor data 102 from an image sensor 101 and compute a set of lens shading calibration parameters that include radial transfer function parameters 136 (e.g., radial lens shading correction parameters) and non-radial surface model parameters 146 (e.g., non-radial lens shading correction parameters).

The calibration image sensor data 102 may comprise a frame of pixels that represent a calibration image, such as a flat-field image. In some embodiments, a flat-field image may be obtained by imaging or simulating a uniformly-illuminated screen to produce an image of uniform color and brightness across the image frame. The flat-field image may be illuminated using a known light source, for example using a D65 or other color standard light. In some embodiments, the calibration image sensor data 102 may comprise one or more values corresponding to individual pixels of the image frame, such as a pixel gain value, a pixel dark current value (e.g., the amount of signal given out by the sensor detector for a pixel when there is no incident light on the sensor 101), and/or other values. The image sensor 101 may comprise a camera module such, but not limited to, any of the cameras discussed with respect to FIGS. 8A-8D. An image sensor 101 may comprise, for example, a monocular camera, a surround camera, wide-view camera, a fisheye camera, a long-range camera, a mid-range camera, a stereo camera, a LIDAR sensor, and/or other image sensors.

In some embodiments, lens shading profile generator 120 may generate a lens shading profile 124 that comprises or otherwise represents a map of pixels corresponding to the pixels of an image frame from the calibration image sensor data 102. The values of individual pixels in the lens shading profile may represent the gain of the lens shading affect occurring in the corresponding pixel of the image frame from the calibration image sensor data 102. In some embodiments, the lens shading profile generator 120 may include a black level correction (BLC) function 122 that can be applied to the calibration image sensor data 102 to linearize or otherwise adjust variations in the pixel dark current values from the sensor data 102, in which case the lens shading profile 124 may be computed using a black level corrected image frame.

Figure 2A:
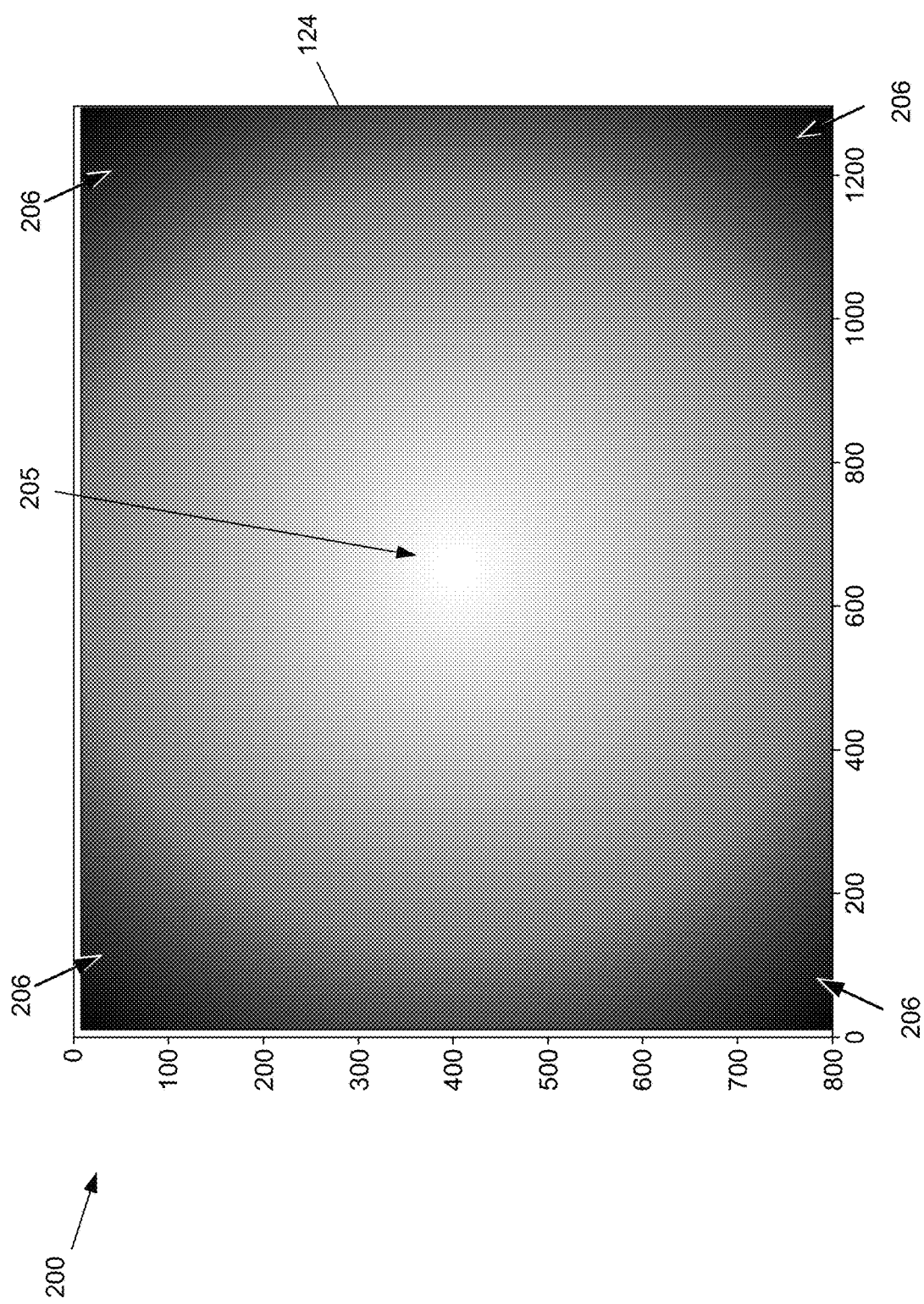
FIGS. 2A-2D are diagrams illustrating determination of a radial transfer function associated with symmetrical lens shading, in accordance with some embodiments of the present disclosure.

In some embodiments, the lens shading profile 124 essentially defines an inverse gain mapping of the lens shading effect appearing in the image frame of the calibration image sensor data 102. For example, referring to FIG. 2A, FIG. 2A at 200 illustrates a lens shading profile 124 where high lens shading gain values may appear at the periphery of the lens shading profile (shown at 206) where the lens shading effect causes the greatest fading of image features, and relatively low gain values may appear toward the middle of the lens shading profile (shown at 205) where the lens shading effect causes the least fading of image features. It should be noted that the lens shading effect illustrated in FIG. 2A shows a high degree of lens shading for illustrative purposes, such as might be observed in embodiment with an image frame produce from a fish-eye or other wide-angle lens image sensor 101. In other embodiments where the image sensor 101 comprise a non-wide-angle lens, the lens shading effect may be less pronounced than illustrated in FIG. 2A, depending on the lens quality of the image sensor 101. Moreover, the lens shading profile 124 may include a lens shading gain value per pixel corresponding to a luminosity, and/or one or more gain values per pixel, corresponding to one or more color channels (e.g., R, Gr, Gb and G color channels).

Figure 2B:
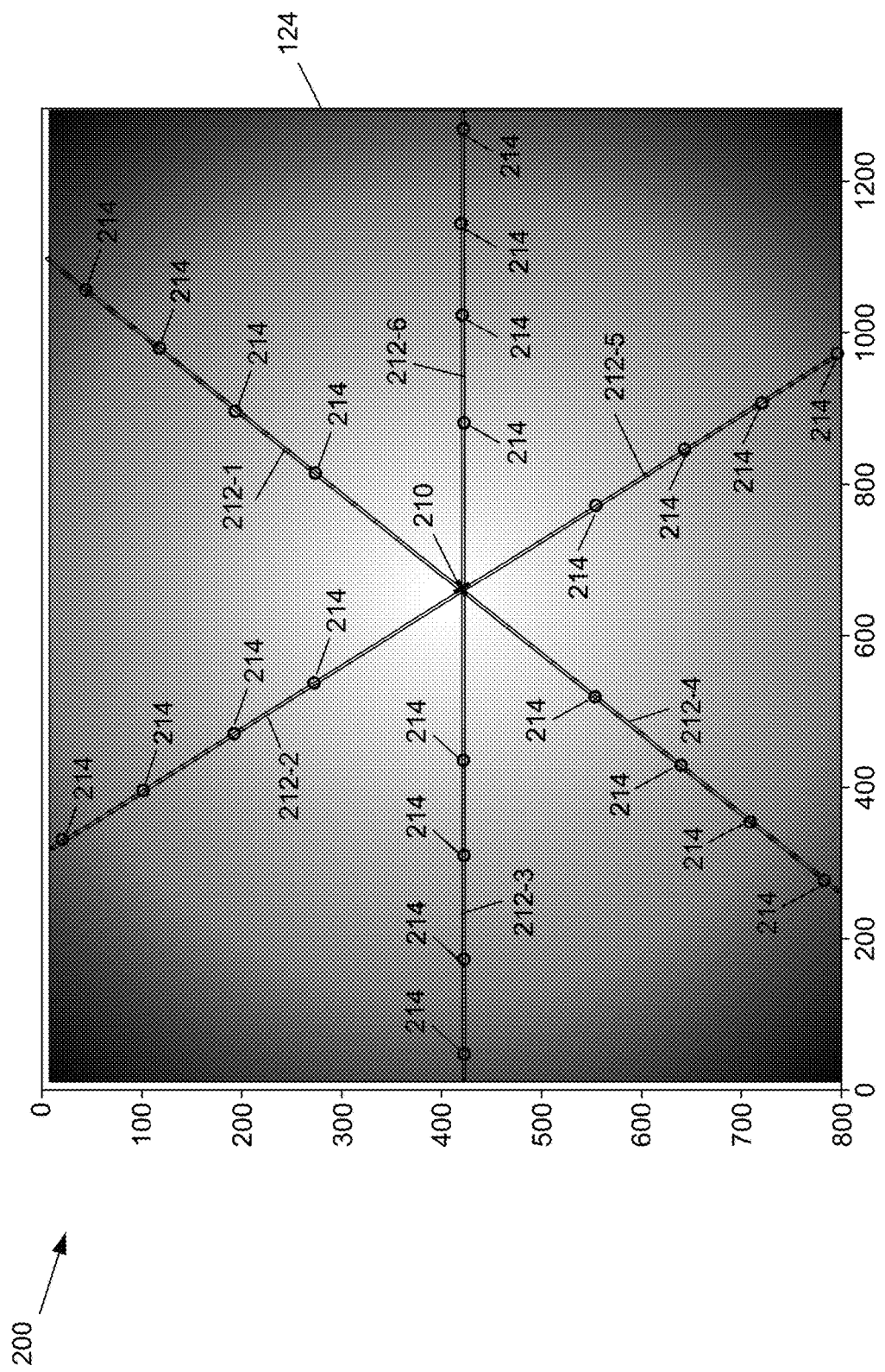

In some embodiments, the radial lens shading calibrator 130 computes a radial transfer function 132 for correcting the symmetrical component of lens shading present in the lens shading profile 124. As illustrated in FIG. 2B, computing of the radial transfer function parameters may include computing an ellipse mask for the lens shading profile 124 and building radial reference data from multiple offset directional radial lines radiating from an optical center 210 of the lens shading profile 124. In the example shown in FIG. 2B, six radial lines (shown at 212-1 to 212-6) are used, each originate from the optical center 210 of the lens shading profile 124 and extend out from the optical center 210 at an offset from each other of 60 degrees. The optical center 210 of the lens shading profile 124 of the lens shading profile 124 may be determined by the radial lens shading calibrator 130, for example, using an optical center estimation algorithm as previously discussed above. Along the individual radial lines, one or more control points 214 may be established at set distances from the optical center 210. The control points 214 may be arranged such that connecting corresponding control points along each radial line forms an ellipse (e.g., a circle) of equal lens shading gain around the optical center 210. For each control point 214, the intensity drop (as compared to the intensity at the optical center) caused by the increase in lens shading gain may be computed to determine a slope corresponding to the rate of change of lens shading at that respective pixel of the lens shading profile 214 where the control point 214 is located. In some embodiments, control points 214 may be located closer together along the radial lines 212-1 to 212-6 where the lens shading gain increases more rapidly (e.g., towards the image periphery) than towards the optical center 210. Although the example in FIG. 2B illustrates an ellipse mask having six radial lines with four control point per radial line, in other embodiments a greater or fewer number of radial lines and/or control points per radial line may be used.

Figure 2C:
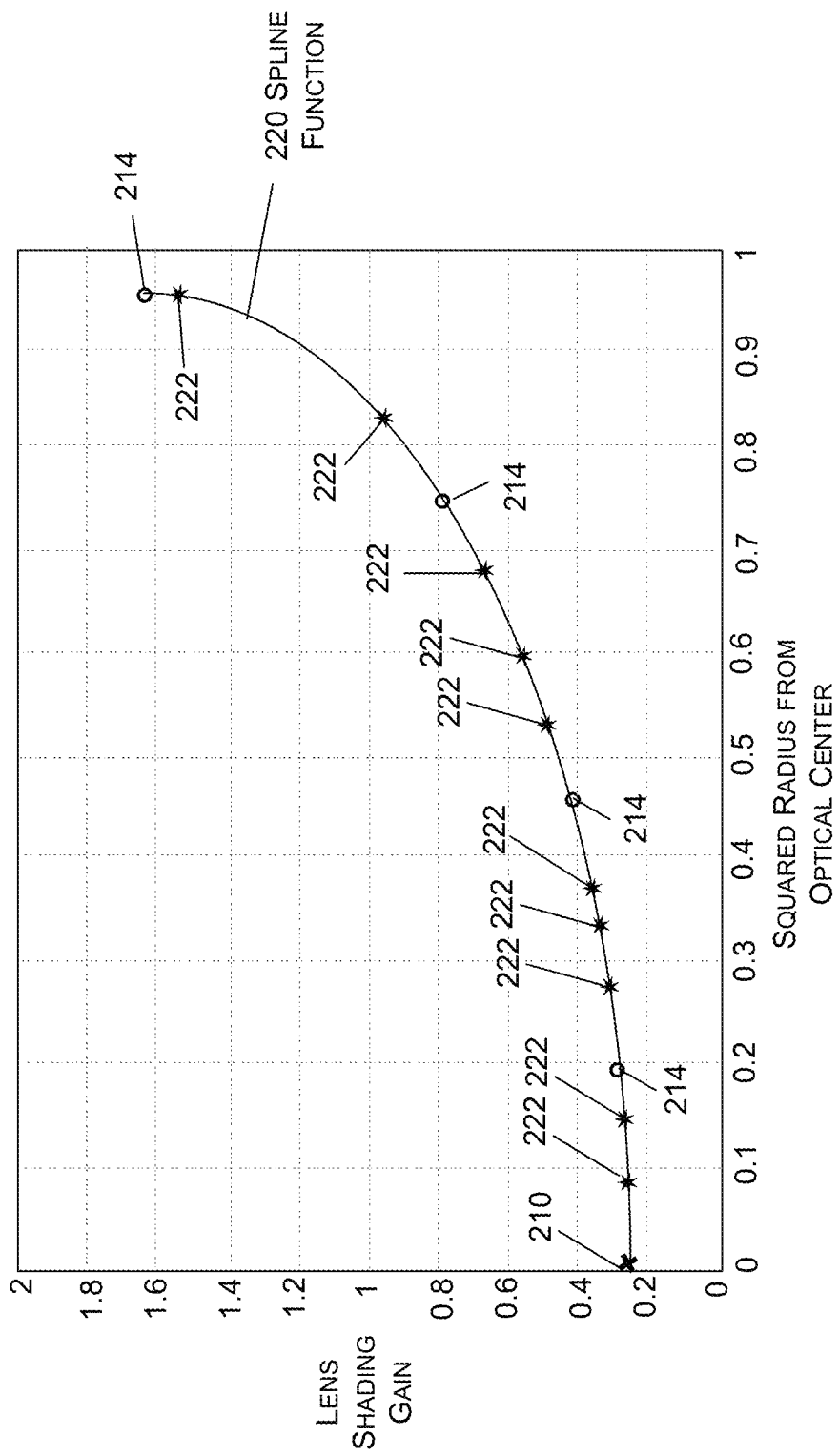

In some embodiments, a cubic Hermite spline may be computed for the individual radial lines 212-1 to 212-6 to curve fit the control points 214. The curve fit may be performed by fitting a cubic Hermite spline over the data corresponding to the control points 214 to model changes in lens shading along the radial lines. For example, as shown in FIG. 2C, in some embodiments, the lens shading gain values at control points 214 for an individual one of radial lines 212-1 to 212-6 may be plotted as a function of the control point's squared radius (e.g., squared distance) from the optical center 210 and a spline function 220 (e.g., defined by piecewise third-degree polynomials) may be used to model the change in lens shading gain across that radial line. In some embodiments, one or more lens shading gain estimation points (shown at 222) along a given radial line may be interpolated from the control points 214 based on the curve of the spline function 220.

In some embodiments, the spline functions 220 derived from the individual radial lines 212-1 to 212-6 may be converted by the radial lens shading calibrator 130 calibration function into radial transfer function parameters 136 that define a radial transfer function. The radial transfer function may comprise a representation of the inverse of the symmetrical component of lens shading in the original image frame from the sensor data 102. As such, when the radial transfer function (as defined by the radial transfer function parameters 136) is applied to the original image frame, the effect of the symmetrical component of lens shading is removed from the image frame.

Figure 2D:
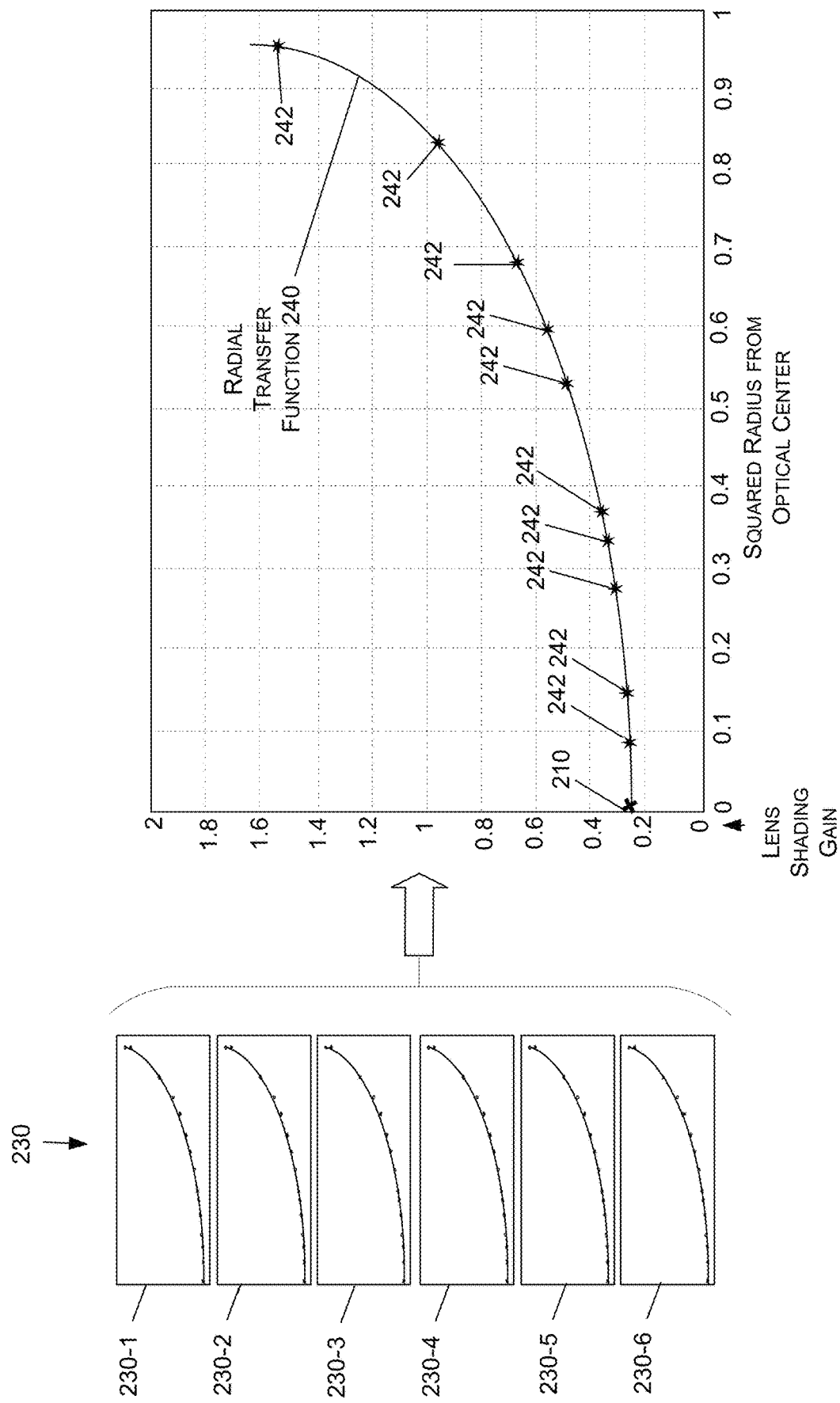

In some embodiments, the radial transfer function may be derived by averaging the spline functions 220 derived from the multiple radial lines 212-1 to 212-6. As shown in FIG. 2D at 230, the radial lens shading calibrator 130 may compute a respective spline function for the individual radial lines 212-1 to 212-6. For example, spline function 230-1 may be derived from control points 214 along radial line 212-1, spline function 230-2 may be derived from control points 214 along radial line 212-2, spline function 230-3 may be derived from control points 214 along radial line 212-3, spline function 230-4 may be derived from control points 214 along radial line 212-4, spline function 230-5 may be derived from control points 214 along radial line 212-5, and spline function 230-6 may be derived from control points 214 along radial line 212-6. Those spline functions (e.g., spline functions 230-1 to 230-6) may be averaged to form an overall radial transfer function 240. Using the radial transfer function 240, a radial (symmetrical) lens shading gain component for any pixel in the image frame of sensor data 102 may be estimated as a function of that pixel's radius from the image center 210. In some embodiments, lens shading gain estimates from one or more lens shading gain estimation points (shown at 242) along the radial transfer function 240 may be computed from the curve of the radial transfer function 240 and stored in memory as a look-up-table. It should be noted that in some embodiments, lens shading gain estimates for pixels not falling on any of the radial lines 212-1 to 212-6 may still be determined from the radial transfer function 240 based on that pixel's distance from the image center 210.

In some embodiments, coefficients characterizing the radial transfer function 240 (e.g., such as cubic Hermite spline coefficients) may be used as radial transfer function parameters 136 and stored to a memory. Then in production environments, as described below, the radial transfer function 240 corresponding to an image sensor 101 may be reproduced from the radial transfer function parameters 136 and applied to pixels of an image frame captured by that image sensor (based on a function of pixel radius from the image optical center) to remove the symmetrical component of lens shading gain from that captured image. In some embodiments, other curve fitting models may be used to fit curves to the lens shading gain measured at control points 214 along the radial lines 212-1 to 212-6 and derive the radial transfer function parameters 136. For example, in some embodiments, polynomial interpolation may be used, with polynomial coefficients defining the radial transfer function parameters 136 for a radial transfer function. In some embodiments, radial transfer function parameters 136 may be computed for one or more channels (e.g., R, Gr, Gb and G color channels) of the pixels of the lens shading profile 124.

Figure 3A:
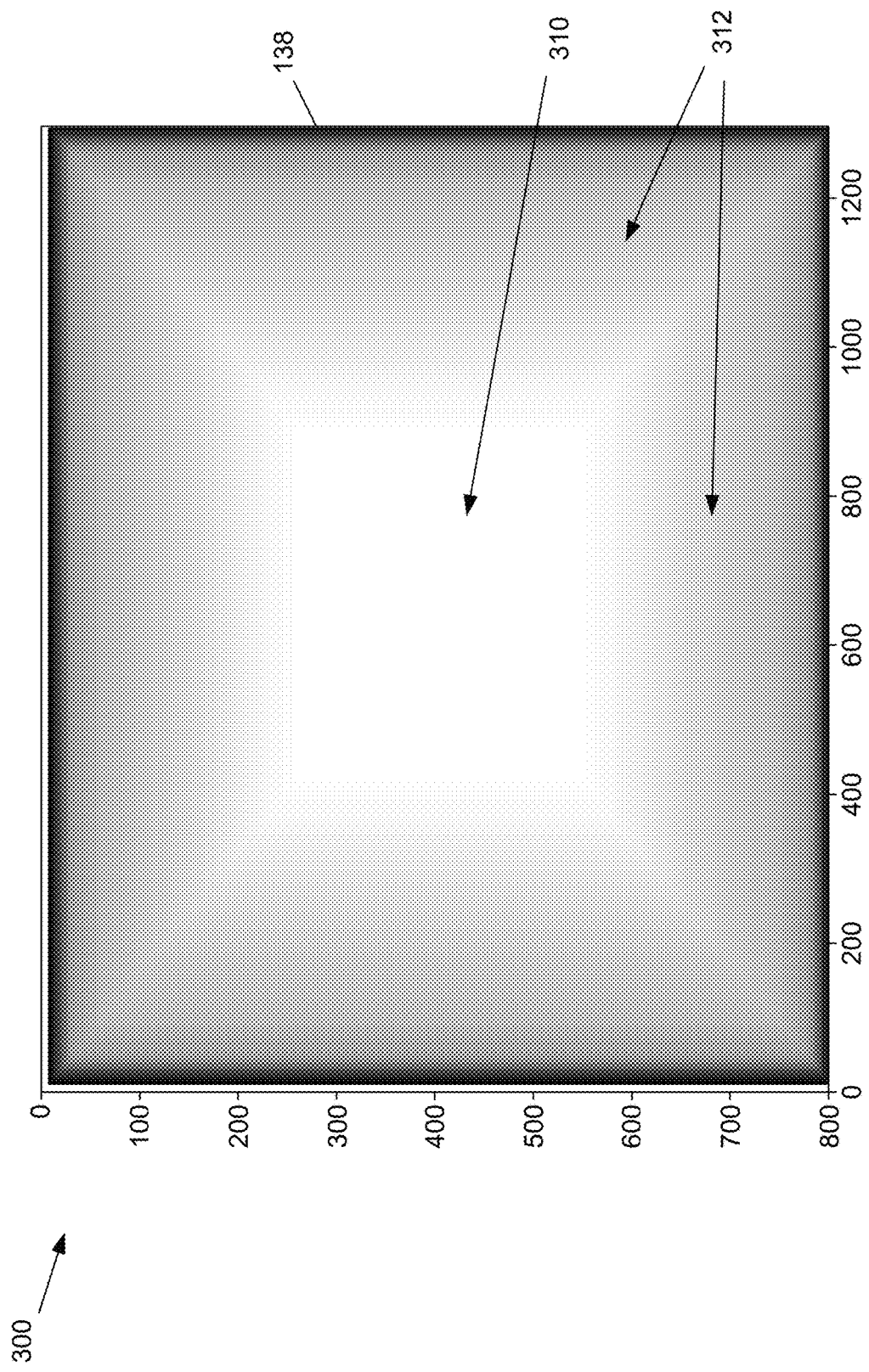
FIGS. 3A-3B are diagrams illustrating determination of a non-radial surface model associated with non-symmetrical lens shading, in accordance with some embodiments of the present disclosure.

Returning again to FIG. 1, in some embodiments, the radial lens shading calibrator 130 (as shown at 134) applies the derived radial transfer function (e.g., based on the computed radial transfer function parameters 136), to the image frame of the calibration images sensor data 102 to produce a residual shading profile 138. The residual shading profile 138 may comprise a version of the original image frame where the effects of the symmetrical component of lens shading have been removed, though a residual of lens shading distortion may remain in the form of non-symmetrical components of lens shading. For example, referring to FIG. 3A, FIG. 3A at 300 illustrates an example residual shading profile 138. In this example residual shading profile 138, non-symmetrical components of lens shading gain may still remain generally towards the periphery of the residual shading profile (shown at 312) where the non-symmetrical lens shading effect causes the greatest fading of image features. Relatively low lens shading gain may appear toward the middle of the residual shading profile (shown at 310) where the non-symmetrical lens shading effect generally causes the least fading of image features.

Figure 3B:
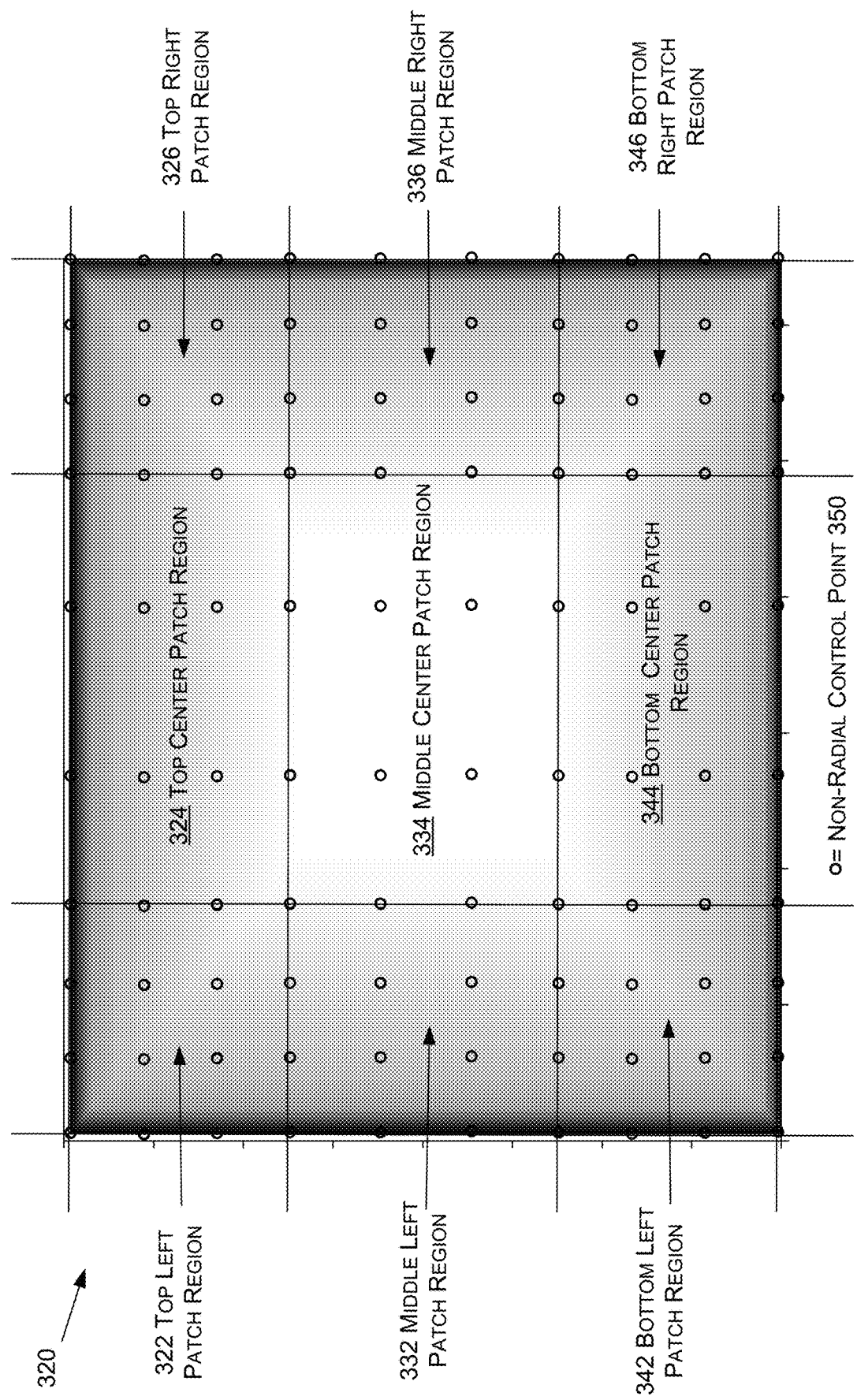

In some embodiments, to remove the residual non-symmetrical components of lens shading from the residual shading profile 138, the non-radial lens shading calibrator 140 calibration function may compute a non-radial surface model 142 (e.g., such as a Bezier surface model) of non-symmetrical lens shading gain, which may be represented using non-radial surface model parameters 146. For example, as shown in FIG. 3B, a Bezier patch array 320 may define a non-radial surface model that comprises a plurality of rectangular patch regions, each patch region comprising a plurality of control points arranged in a grid. A Bezier patch array 320 may be determined and used for non-symmetrical components calibrating lens shading correction. As an example, the Bezier patch array 320 may comprise a 10×10 array of non-radial control points 350. For each control point 350, the intensity drop (as compared to the intensity at the optical center) caused by the increase in non-symmetrical lens shading gain may be computed to determine a slope corresponding to the rate of change of lens shading at that respective pixel of the residual shading profile 138 where the control point 350 is located. The Bezier patch array 320 may be divided into a grid of patch regions. For example, the Bezier patch array 320 as illustrated in FIG. 3B may be divided into a 3×3 grid of patch regions where each patch region defines a 4×4 array of control points 350. In some embodiments, a Bezier patch array may be established for one or more channels (e.g., R, Gr, Gb and G color channels) of the pixels of the residual shading profile 138. The Bezier patch array 320 includes a top left patch region 322, a top center patch region 32, a top right patch region 326, a middle left patch region 332, a middle center patch region 334, a middle right patch region 336, a bottom left patch region 342, a bottom center patch region 344, and a bottom right patch region 346.

The control points 350 of the Bezier patch array 320, as arranged in the various patch regions, may be used to fit a non-radial lens shading model (e.g., a non-radial surface model) that corrects residual non-symmetrical lens shading error remaining in the residual shading profile 138. In some embodiments, the control points 350 of the Bezier patch array 320 may define a Bezier surface that provides a reciprocal surface, such that when the value of a pixel on the Bezier surface is multiplied by the pixel values in the residual shading profile 138, the values are flattened out so that the original image frame of the flat field is obtained with shading effects from symmetrical and non-symmetrical lens shading mitigated. In one embodiment, the control points 350 of the Bezier patch array 320 define control points for a bi-cubic Bezier surface that may be represented and reproduced using the non-radial surface model parameters 146. The non-radial surface model parameters 146 for the non-radial surface model may be computed by applying a series of curve fitting interpolations using the control points 350. For example, a Bezier surface may be determined by computing a series of interpolations with the resulting cubic Bezier coefficients defining the non-radial surface model parameters 146.

In some embodiments, in order to quantify the effectiveness of lens shading mitigation provided using the radial transfer function parameters 136 and the non-radial surface model parameters 146, the lens shading calibration system 110 may apply the non-radial surface model 142 to the residual shading profile 138 (as shown at 144) to generate a calibrated image frame 150. One or more metrics, such as uniformity metrics, may be applied to the calibrated image frame to quantify the effectiveness of the calibration flow.

Figure 4:
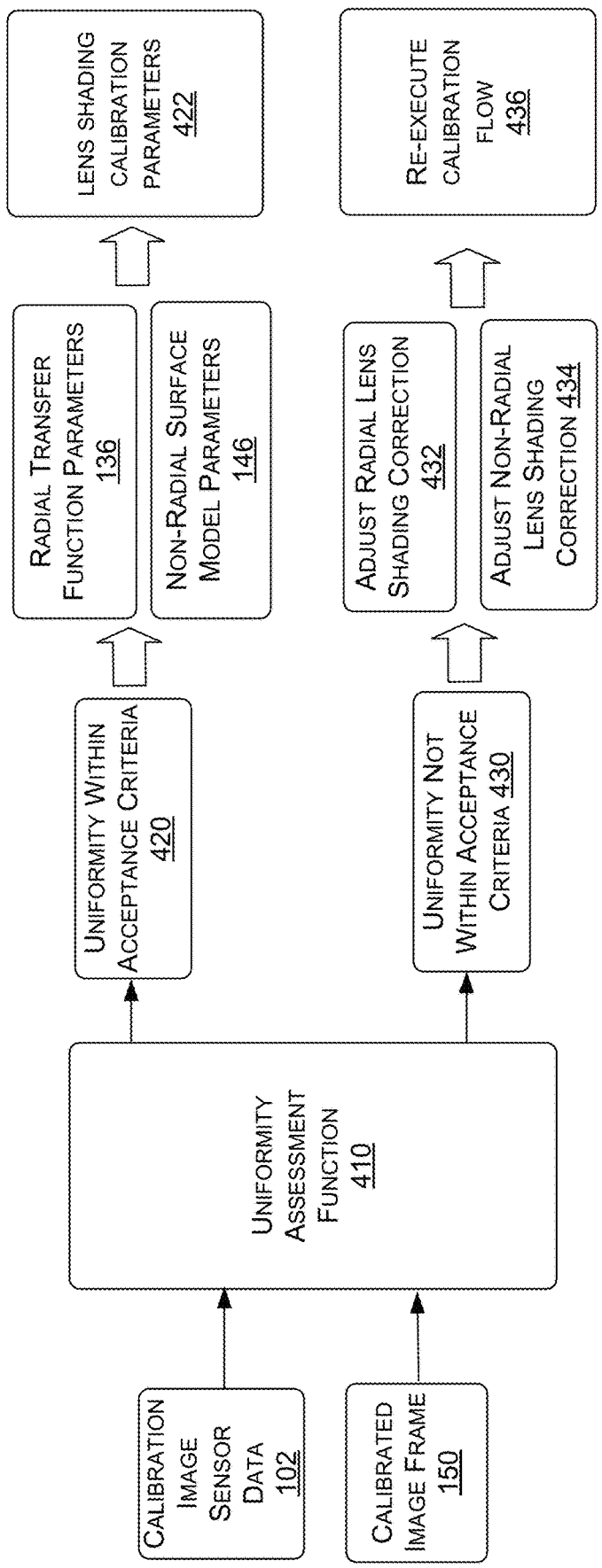
FIG. 4 is a block diagram illustrating uniformity assessment, in accordance with some embodiments of the present disclosure.

For example, referring now to FIG. 4, the lens shading calibration system 110 may further comprise a uniformity assessment function 410 that inputs the calibration image sensor data 102 and the calibrated image frame 150 to compute a uniformity metric that indicates a degree of uniformity of pixel gain (e.g., for one or more R, Gr, Gb and G color channels) in the calibrated image frame 150 as compared to the uniformity of pixel gain in the image frame of the calibration image sensor data 102. If the values according to the uniformity metrics are within an acceptance criteria (shown at 420) then the radial transfer function parameters 136 and non-radial surface model parameters 146 may be saved to memory as lens shading calibration parameters 422. These lens shading calibration parameters 422 may be used by other systems and/or processes to remove symmetrical and/or non-symmetrical lens shading from images captured by image sensors. If the values according to the uniformity metric(s) are not within the acceptance criteria (shown at 430), then the calibration flow may be adjusted accordingly and the radial transfer function parameters 136 and/or non-radial surface model parameters 146 recomputed. For example, additional control points may be added for one or both of the radial lens shading correction calibration and the non-radial lens shading correction, and/or existing control points may be removed or relocated. As an example, if the uniformity assessment function 410 detects residual symmetric lens shading artifacts in the calibrated image frame 150 exceeding an acceptance criteria, then the radial lens shading calibration process performed by radial lens shading calibrator 130 may be adjusted (as shown at 432). If the uniformity assessment function 410 detects residual non-symmetric lens shading artifacts in the calibrated image frame 150 exceeding an acceptance criteria, then the non-radial lens shading calibration process performed by non-radial lens shading calibrator 140 may be adjusted (as shown at 434). The calibration flow may be re-executed by the lens shading calibration system 110 (shown at 436) to recompute the radial transfer function parameters 136 from the lens shading profile 124 and the non-radial surface model parameters 146 from the residual shading profile 138. In some embodiments, the calibration flow may be interactively re-executed until the uniformity metric acceptance criteria is satisfied.

Figure 5:
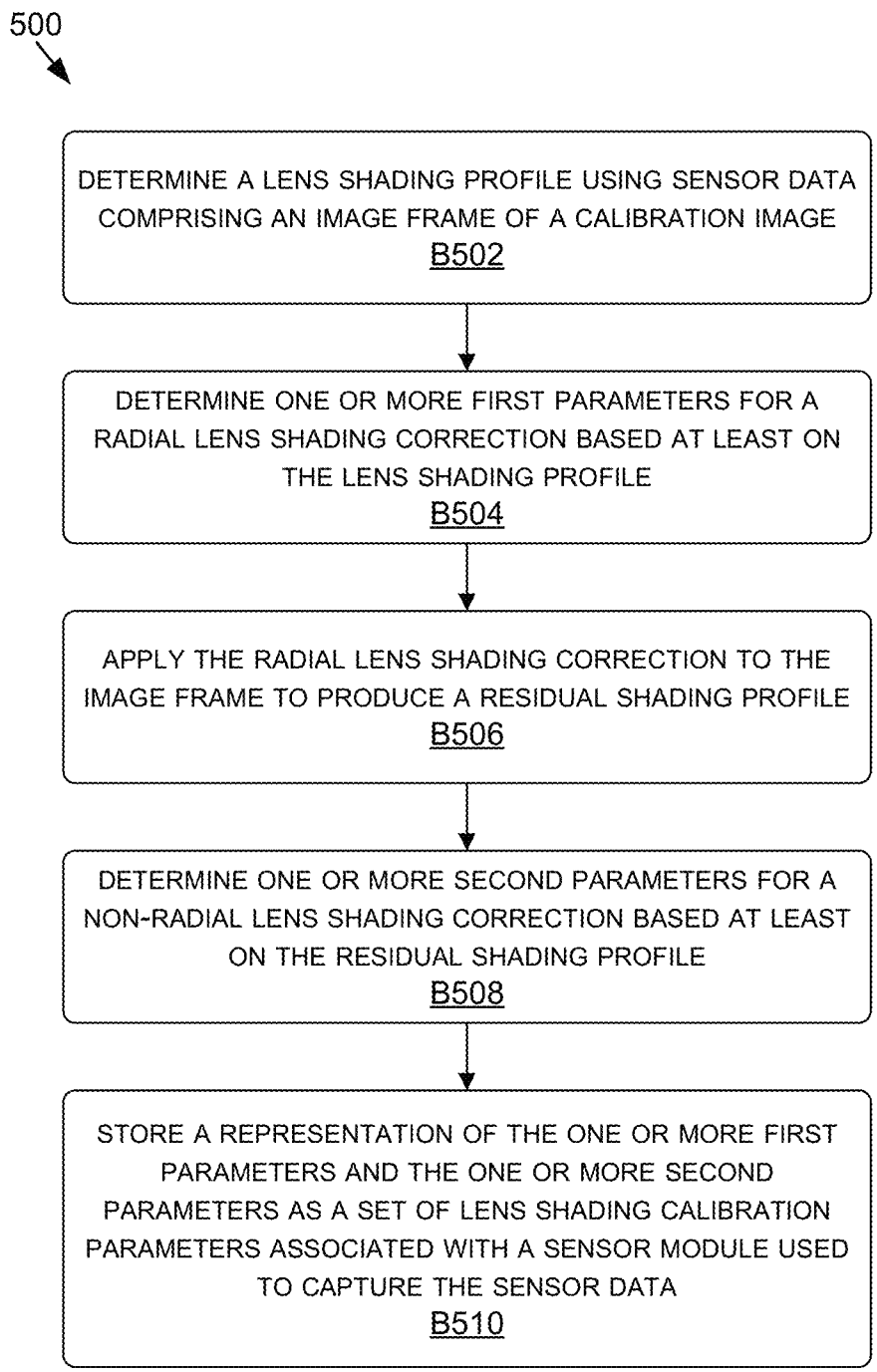
FIG. 5 is a flow diagram illustrating a method to generate lens shading calibration parameters, in accordance with some embodiments of the present disclosure.

Now referring to FIG. 5, FIG. 5 is a flow diagram showing a method 500 for calibration for sensor lens shading using non-radial correction of residual radial shading error. It should be understood that the features and elements described herein with respect to the method 500 of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa.

Each block of method 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 500 is described, by way of example, with respect to the lens shading calibration system 110 of FIG. 1. However, these methods may additionally or alternatively be executed by any one system, or any combination of systems, including, but not limited to, those described herein.

The method 500, at block B502, includes determining a lens shading profile using sensor data comprising an image frame of a calibration image. In some embodiments, a lens shading profile generator may generate a lens shading profile that comprises or otherwise represents a map of pixels corresponding to the pixels of an image frame from calibration image sensor data. The calibration image sensor data may comprise a frame of pixels that represent a calibration image, such as a flat-field image. The values of individual pixels in the lens shading profile may represent the gain of the lens shading affect occurring in the corresponding pixel of the image frame from the calibration image sensor data. The lens shading profile generator 120 may include a black level correction (BLC) function that can be applied to the calibration image sensor data to linearize or otherwise adjust variations in the pixel dark current values from the calibration image sensor data. As such, the lens shading profile may be determined using a black level corrected calibration image frame. In some embodiments, the lens shading profile may comprise one or more color channels. For example, a pixel of the lens shading profile may represent a gain of a lens shading affect occurring in the corresponding pixel of the image frame in one or more of R, Gr, Gb and/or G color channels.

The method 500, at block at B504, includes determining one or more first parameters for a radial lens shading correction based at least on the lens shading profile. These first parameters for radial lens shading correction may comprise the radial transfer function parameters 136 discussed herein. The parameters for a radial lens shading correction may be determined by the radial lens shading calibrator 130 function of the lens shading calibration system 110. The radial transfer function may be used for correcting a symmetrical component of lens shading present in the image frame. In some embodiments, determining the one or more first parameters for a radial lens shading correction may include, as discussed with respect to FIGS. 2A-2D, determining a plurality of control points on a plurality of radial lines from an optical center of the lens shading profile; computing a slope corresponding to a rate of change of lens shading at pixels of the lens shading profile corresponding to the plurality of control points; computing a curve fitting for the plurality of radial lines based at least on the plurality of control points and the slope at the plurality of control points; and determining the one or more first parameters for the radial lens shading correction based at least on the curve fitting for the plurality of radial lines. In some embodiments, the method 500 may include computing a curve fitting for the plurality of radial lines using a cubic Hermite spline. In some embodiments, spline functions for the plurality of radial lines may be averaged to form an overall radial transfer function. Using the radial transfer function, a radial (symmetrical) lens shading gain component for any pixel in the image frame of sensor data may be estimated as a function of that pixel's radius from the image center. In some embodiments, coefficients characterizing the radial transfer function (e.g., such as cubic Hermite spline coefficients) may be used as the radial transfer function parameters. In some embodiments, other curve fitting models may be used to fit curves to the lens shading gain measured at control points along the radial lines and derive the radial transfer function parameters. For example, in some embodiments, polynomial interpolation may be used, with polynomial coefficients defining the radial transfer function parameters 136 for a radial transfer function.

The method 500, at block at B506, includes applying the radial lens shading correction to the image frame to produce a residual shading profile. The residual shading profile may comprise a version of the original image frame where effects of the symmetrical component of lens shading have been removed, though a residual of lens shading distortion may remain in the form of non-symmetrical components of lens shading. In some embodiments, a radial lens shading correction model may be adjusted to remove a symmetrical component of a lens shading effect based at least on the one or more first parameters.

The method 500, at block at B508, includes determining one or more second parameters for a non-radial lens shading correction based at least on the residual shading profile. These second parameters for non-radial lens shading correction may comprise the non-radial surface model parameters 146 discussed herein. In some embodiments, determining the one or more second parameters for a non-radial lens shading correction may include, as discussed with respect to FIGS. 3A-3B, determining a patch array comprising a grid that includes a plurality of control points; computing a slope corresponding to a rate of change of lens shading at pixels of the lens shading profile corresponding to the plurality of control points; determining a surface fitting for the patch array based at least on the plurality of control points and the slope at the plurality of control points; and determining the one or more second parameters for the non-radial lens shading correction based at least on the surface fitting for the patch array. In some embodiments, the method may include computing a surface fitting, such as Bezier surface fitting, for the patch array based at least on the plurality of control points and/or the surface slope at the plurality of control points. For example, a Bezier patch array, such as shown in FIG. 3B, may define a non-radial surface model that comprises a plurality of rectangular patch regions, each patch region comprising a plurality of control points arranged in a grid. As an example, the surface model may comprise an array of non-radial control points, where for each control point, the intensity drop caused by the increase in non-symmetrical lens shading gain may be computed to determine a slope corresponding to the rate of change of lens shading at that respective pixel of the residual shading profile where the control point is located. In some embodiments, a Bezier patch array may be established for one or more channels (e.g., R, Gr, Gb and G color channels) of the pixels of the residual shading profile. The control points may be used to fit a non-radial lens shading model (e.g., a non-radial surface model) that corrects residual non-symmetrical lens shading error remaining in the residual shading profile 138. In some embodiments, the control points may define a reciprocal surface, such that when the value of a pixel on the model surface is multiplied by the pixel values in the residual shading profile, non-symmetrical lens shading effects are mitigated. In some embodiments, a non-radial lens shading correction model may be adjusted to remove a non-symmetrical component of a lens shading effect based at least on the one or more second parameters.

The method 500, at block at B510, includes storing a representation of the one or more first parameters and the one or more second parameters as a set of lens shading calibration parameters associated with a sensor module used to capture the sensor data. In some embodiments one or more operations may be performed based at least on the set of lens shading calibration parameters, such as calibrating an image of an environment captured by an image sensor. In some embodiments, the method may apply the non-radial lens shading correction to the residual shading profile to produce a calibrated image frame. One or more metrics, such as uniformity metrics, may be determined from the calibrated image frame. Based on the metrics, an adjustment may be made too one or more of the one or more first parameters and the one or more second parameters. For example, if a uniformity metric determined using the calibrated image frame is not within the acceptance criteria, then the calibration flow may be adjusted accordingly and the radial transfer function parameters and/or non-radial surface model parameters recomputed. Additional control points may be added for the radial lens shading correction calibration and/or the non-radial lens shading correction, and/or existing control points may be removed or relocated. The method 500 may then be re-executed to re-compute the radial transfer function parameters from the lens shading profile and the non-radial surface model parameters from the residual shading profile. In some embodiments, the calibration flow may be interactively re-executed until the uniformity metric acceptance criteria is satisfied.

Figure 6:
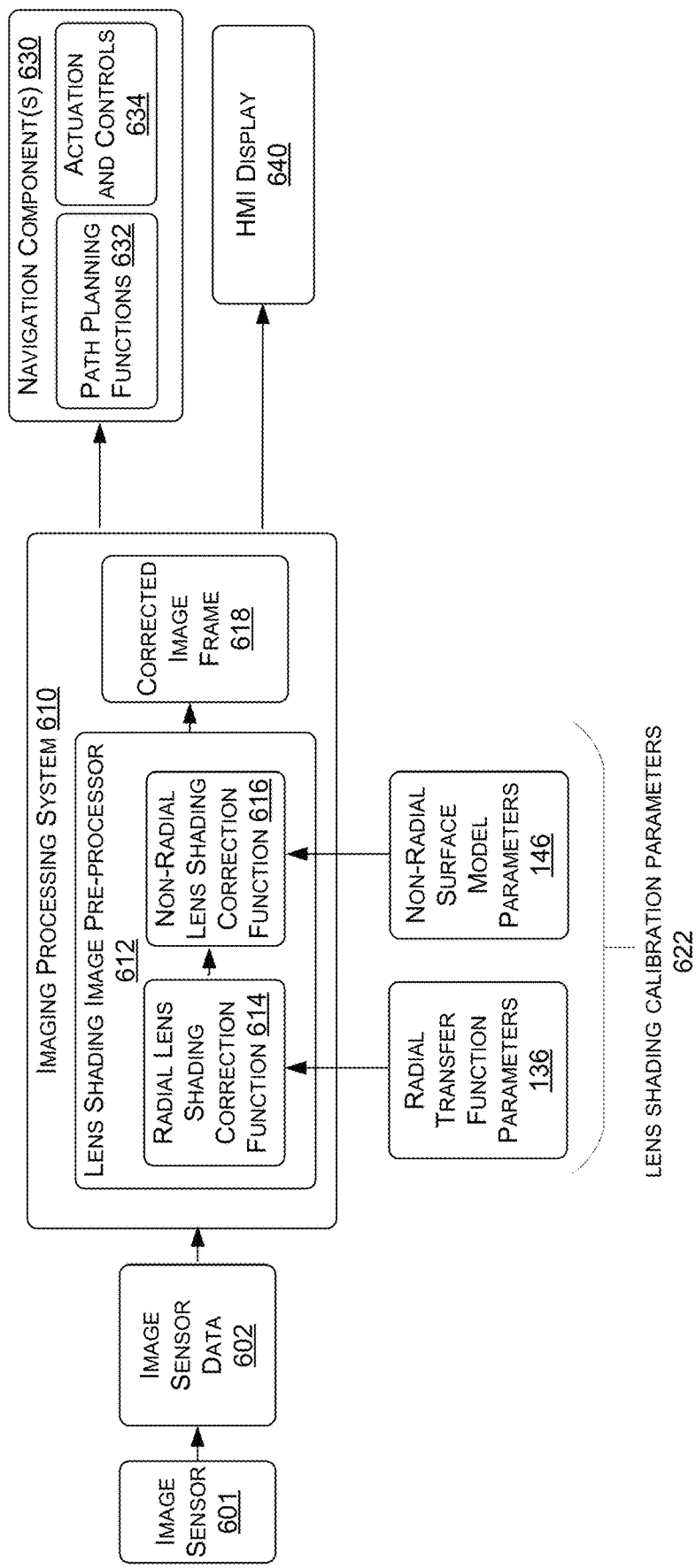
FIG. 6 is a data flow diagram illustrating an image processing system to apply lens shading calibration to captured images, in accordance with some embodiments of the present disclosure.

As previously mentioned, the set of lens shading calibration parameters computed by the calibration flow may be stored and/or used by applications and/or processes to remove lens shading from captured image frames. As an example, FIG. 6 illustrates an image processing system 610 that adjusts image sensor data 602 to apply lens shading calibration based on lens shading calibration parameters 622 that include radial transfer function parameters 136 and non-radial surface model parameters 146. In some embodiments, the radial transfer function parameters 136 and non-radial surface model parameters 146 may be generated by a lens shading calibration system, such as the lens shading calibration system 110 discussed herein. The image processing system 610 may receive the image sensor data 602 generated by an image sensor 601. The image sensor 601 may comprise a camera module such, but not limited to, any of the cameras discussed with respect to FIGS. 8A-8D. An image sensor 601 may comprise, for example, a monocular camera, a surround camera, wide-view camera, a fisheye camera, a long-range camera, a mid-range camera, a stereo camera, a LIDAR sensor, and/or other image sensors. For example, image sensor data 602 may comprising an image frame representing a scene around an autonomous machine such as, but not limited to, vehicle 800. Due to factors such as design or fabrication imperfections with respect to either the lens and/or sensor of the image sensor 601, the image sensor data 602 may include one or both of symmetrical and non-symmetrical lens shading components.

In the embodiment shown in FIG. 6, a lens shading image pre-processor 612 of the image processing system 610 may receive the image sensor data 602. The lens shading image pre-processor 612 may load the radial transfer function parameters 138 into a radial lens shading correction function 614, and apply a radial transfer function to the image sensor data 602 to remove the effects of the symmetrical component of lens shading from the image sensor data 602. The lens shading image pre-processor 612 may load the non-radial surface model parameters 146 into a non-radial lens shading correction function 616, and apply a non-radial surface model to remove the residual symmetrical component of lens shading from the image sensor data 602 after processing by the radial lens shading correction function 614. In some embodiments, the radial lens shading correction function 614 and the non-radial lens shading correction function 616 may be implemented as a combined function that simultaneously applies radial and non-radial lens shading correction based on the radial transfer function parameters 138 and radial lens shading correction function 614. The corrected (e.g., calibrated) image frame 618 output from the shading image pre-processor 612 may comprise a version of the image frame represented in the image sensor data 602 from which shading effects from symmetrical and non-symmetrical lens shading are mitigated, and which may be used by other systems and/or processes (e.g., a machine learning model, stitching application, and/or other purposes) that is more accurate than the original image from the raw sensor data 602. For example, in some embodiments, the corrected image frame 618 may be combined (e.g., stitched) with other image frames and presented on a human machine interface (HMI) display 640.

In some embodiments, the corrected image frame 618 may be used by one or more downstream navigation components 630 of an ego-machine, such as the controller(s) 836 discussed below. The downstream navigation components 124, for example, may implement functions such as object avoidance navigation functions and/or a world model manager, a path planner, a control component, a localization component, an obstacle avoidance component, an actuation component, and/or the like, to perform operations for controlling the ego-machine through an environment. For some embodiments, the downstream navigation components 124 may include at least one or more path planning functions 632 (such as path planning functions for ego-machine 800) and/or actuation and controls 634 (such as the steering or break actuators or other controller discussed herein with respect to ego-machine 800). For example, the path planning functions 632 may include a configuration space manager, a freespace manager, a reachability manager, and a path evaluator. The configuration space manager may manage a pose configuration space, which represents poses comprising positions and orientations of the ego-machine in its environment. The freespace manager and the reachability manager may process the pose configuration space to determine one or more paths for maneuvering from a current pose to a target pose in the pose configuration space based at least in part on the corrected image frame 618 output from the lens shading image pre-processor 612. The path evaluator may identify one or more proposed or potential paths for the vehicle based at least on the assessment by the reachability manager.

In some embodiments, the calibration flow may be performed to obtain radial transfer function parameters 136 and non-radial surface model parameters 146 for a selected image sensor 101 to obtain a standard set of lens shading calibration parameters that may be programed into a plurality of production autonomous machines for use with image sensor 601 modules of the same or similar type as the image sensor 101. In other embodiments, the production camera module used for image sensor 601 may be individually calibrated using the above describe calibration flow to obtain a custom set of lens shading calibration parameters particularly computed for that image sensor 601. These embodiments provided herein thus provide a technique by which sensor data generated by a less expensive production grade image sensor modules can be corrected to obtain lens shading free image frames of a quality that would be produced by relatively more expensive high-precision grade camera modules.

Figure 7:
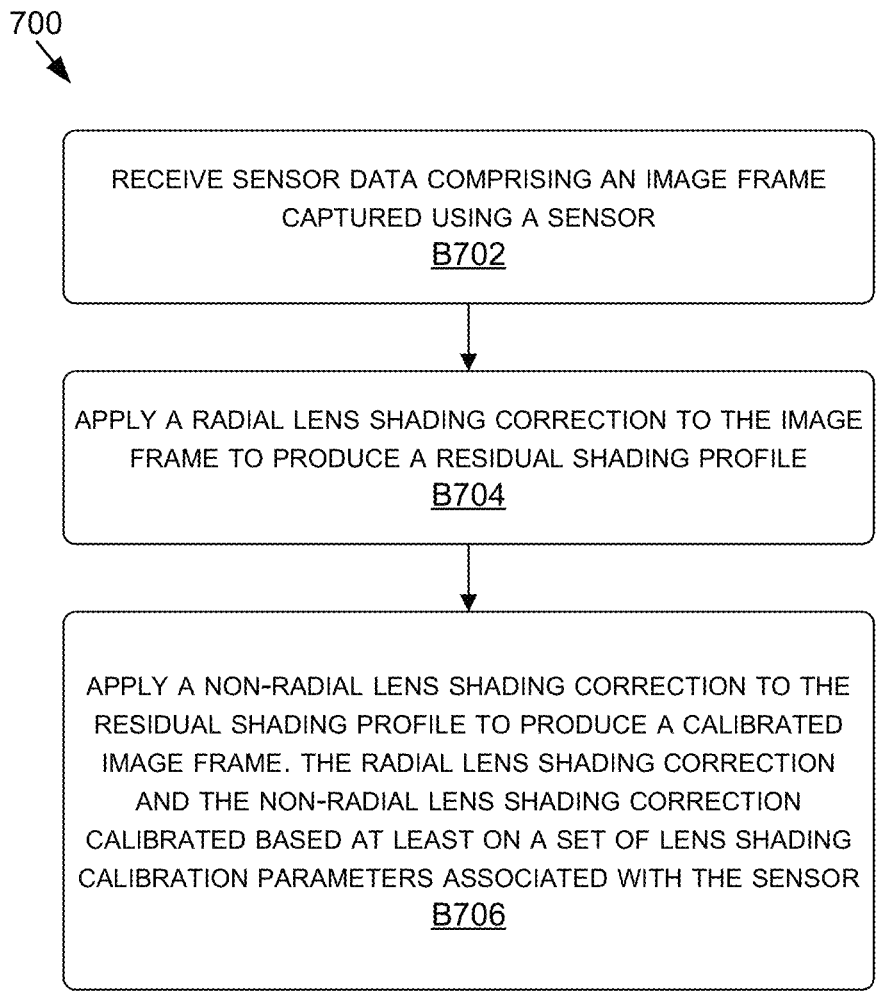
FIG. 7 is a flow diagram illustrating a method to apply lens shading calibration to captured images, in accordance with some embodiments of the present disclosure.

Now referring to FIG. 7, FIG. 7 is a flow diagram showing a method 700 for lens shading image correction systems and applications using non-radial correction of residual radial shading error. It should be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa.

Each block of method 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 700 is described, by way of example, with respect to the image processing system 610 of FIG. 6. However, these methods may additionally or alternatively be executed by any one system, or any combination of systems, including, but not limited to, those described herein.

The method 700, at block B702, includes receiving sensor data comprising an image frame captured using a sensor. The sensor may include at least one of a monocular camera, a surround camera, wide-view camera, a fisheye camera, a long-range camera, a mid-range camera, a stereo camera, or a LIDAR sensor.

The method 700, at block B704, includes applying a radial lens shading correction to the image frame to produce a residual shading profile. As discussed herein, applying the radial lens shading correction may remove a symmetrical component of a lens shading effect using a radial transfer function, the radial transfer function calibrated using a set of radial transfer function parameters of the set of lens shading calibration parameters. In some embodiments, the set of radial transfer function parameters represent a curve fitting of symmetrical lens shading gain for a plurality of radial lines radiating from an optical center of a lens shading profile associated with the sensor. The set of radial transfer function parameters may represent a curve fitting of symmetrical lens shading gain for a plurality of radial lines from an optical center of a lens shading profile associated with the sensor using a cubic Hermite spline. In some embodiments, a lens shading image pre-processor of an imaging processing system, such as shown in FIG. 6, may receive the image sensor data and the radial transfer function parameters. Using the radial transfer function parameters, the lens shading image pre-processor may generate a radial transfer function that representation an inverse of the symmetrical component of lens shading present in the original image frame so that when the radial transfer function is applied to the image sensor data, the effect of the symmetrical component of lens shading is removed from the image frame.

The method 700, at block B706, includes applying a non-radial lens shading correction to the residual shading profile to produce a calibrated image frame (e.g., a corrected image frame). The radial lens shading correction and the non-radial lens shading correction may be calibrated based at least on a set of lens shading calibration parameters associated with the sensor. As discussed herein, applying the non-radial lens shading correction may remove a non-symmetrical component of a lens shading effect using a non-radial surface model, the non-radial surface correction model calibrated using a set of non-radial surface model parameters of the set of lens shading calibration parameters. In some embodiments, the set of non-radial surface model parameters represent a surface fitting of a patch array comprising a plurality of rectangular patch regions. In some embodiments, the lens shading image pre-processor may receive the output from the radial lens shading correction, and using the non-radial surface model parameters, the lens shading image pre-processor may generate a non-radial surface model (e.g., Bezier surface model), of a reciprocal surface, such that when multiplied by the pixel values in a residual shading profile, the values are flattened out so that the original image frame of sensor data is obtained with effects of symmetrical and non-symmetrical lens shading at least in part removed or mitigated. In some embodiments, one or more operations may be performed based at least on the calibrated image frame. For example, in some embodiments, the calibrated image frame may be used by a navigation component of a machine, such as vehicle 800, to compute a path for an ego-machine to travel that avoids collisions with obstacles based at least on the data comprising the representation of the calibrated image frame. In some embodiments, the calibrated image frame may be used control a movement of an ego-machine within an environment based at least on the data comprising the representation of the calibrated image frame. In some embodiments, the calibrated image frame may be used to generate a display for a human machine interface, the display comprising the calibrated image frame stitched with at least one other image frame.

With these and other embodiments described herein, calibrated image frame may be generated that are substantially free lens shading, using relatively inexpensive production quality grade image sensors, and/or very wide-angle lenses, that are prone to generating lens shading.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 8A:
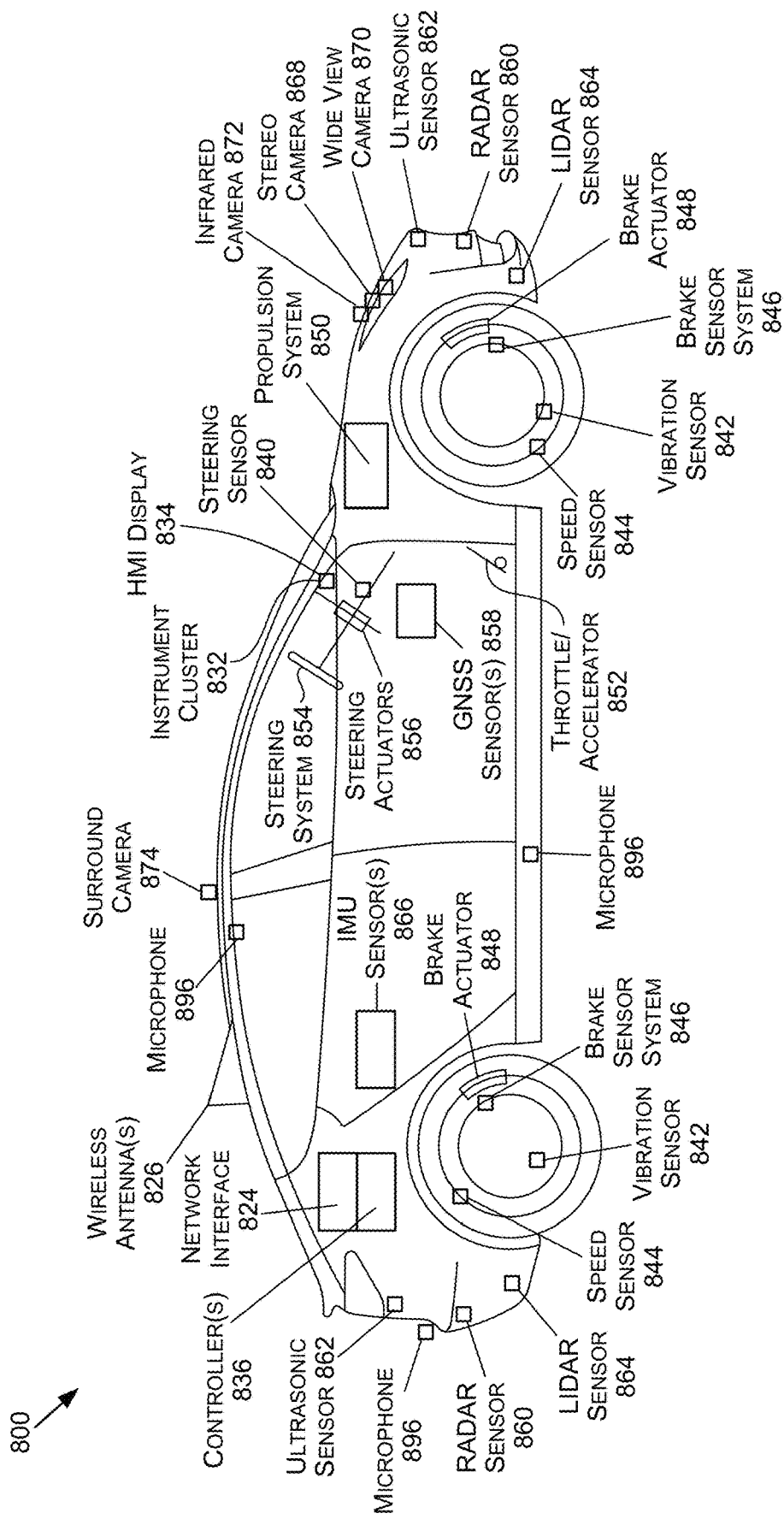
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof. In some embodiments, one or more functions described herein with respect to the imaging processing system 610, HMI display 640, and/or the navigation component(s) 630 may be executed by the controller(s) 136. In some embodiments, one or more functions described herein with respect to the lens shading calibration system 110 may be executed by the controller(s) 136.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). In some embodiments, the HMI display 640 is implemented using HMI display 834.

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
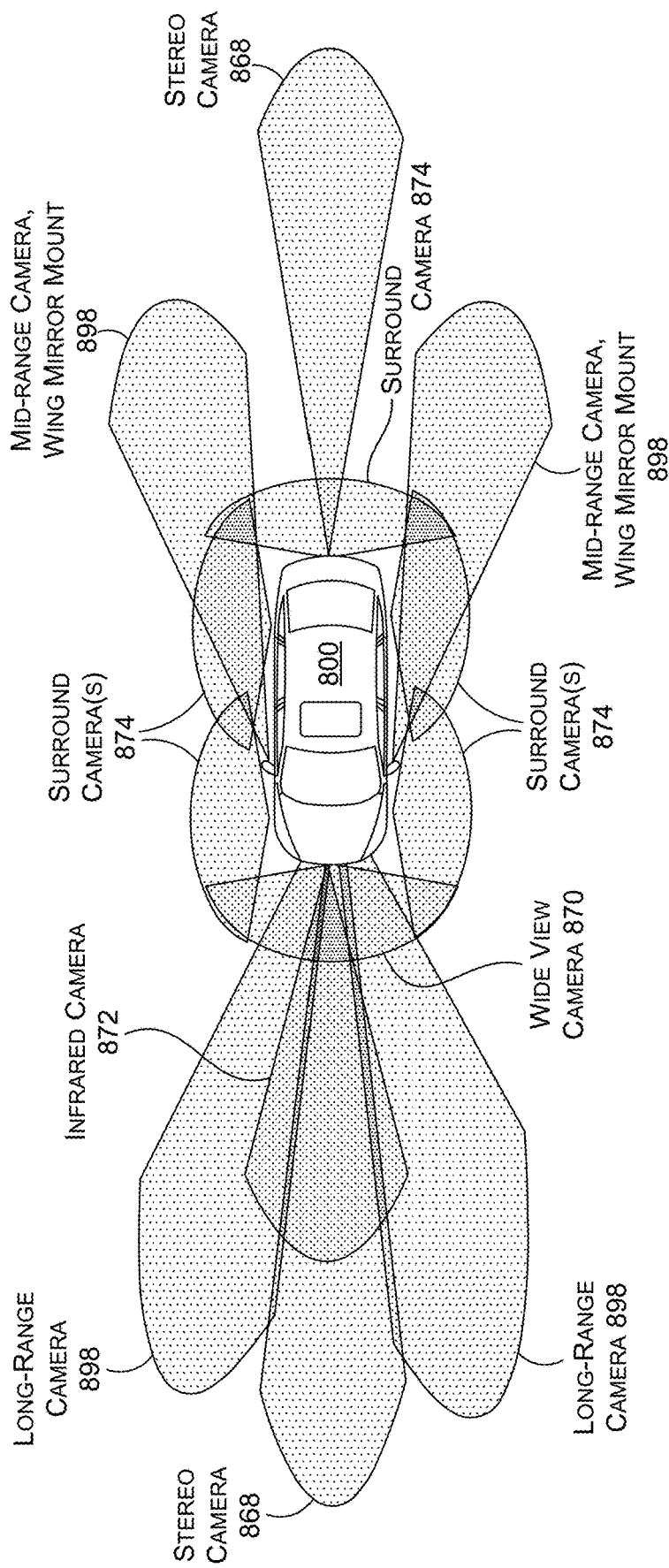
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800. In some embodiments, image sensor 601 may be implemented using one or more of the cameras shown in FIG. 8B.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition. In some embodiments, such functions performed based on camera data may be performed using one or more calibrated image frames (such as corrected image frame 618) which have been calibrated to remove symmetrical and non-symmetrical lens shading effects.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
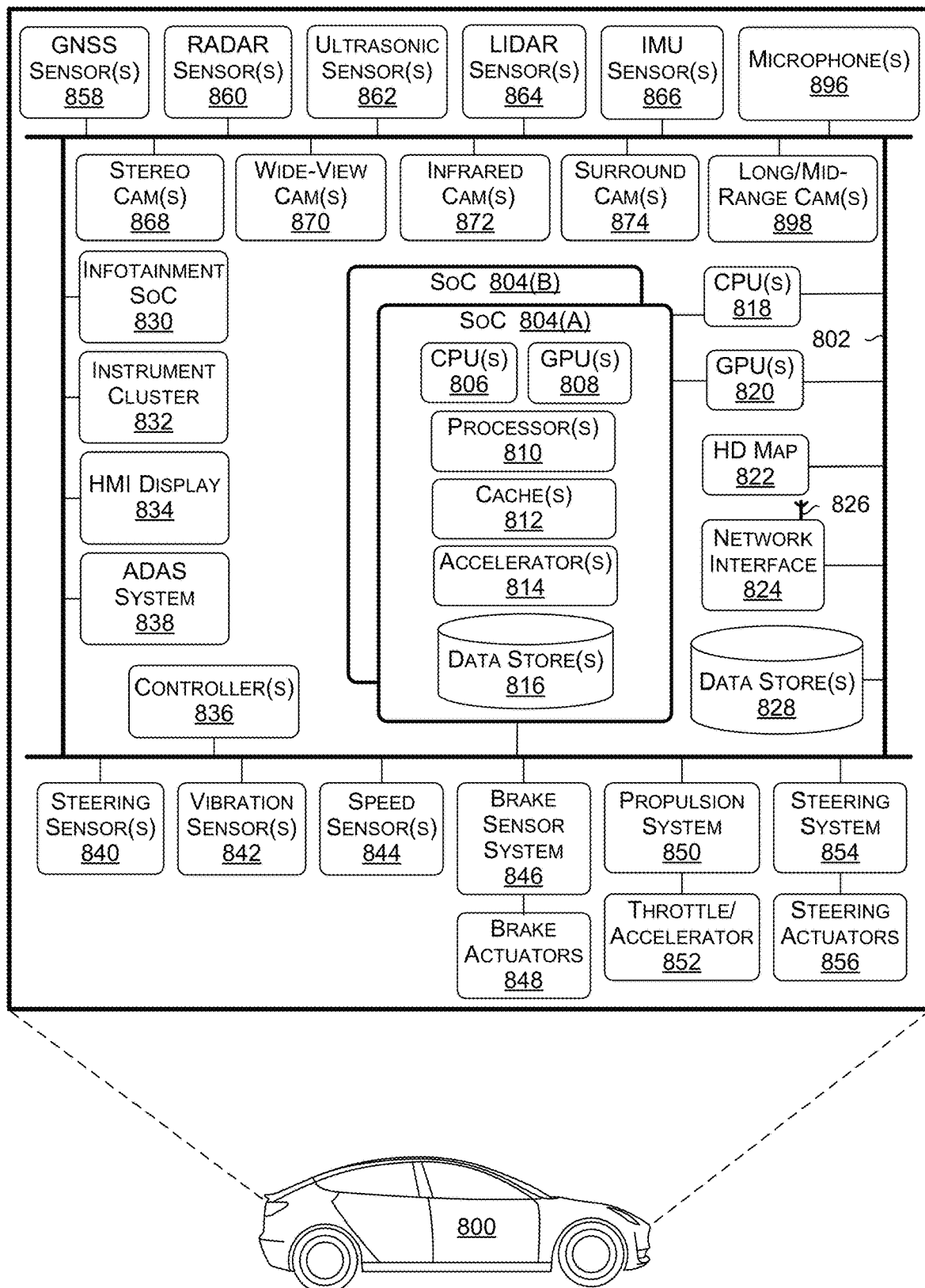
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example. In some embodiments, elements of the lens shading image pre-processor 612 may be executed using CPU(s) 818.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
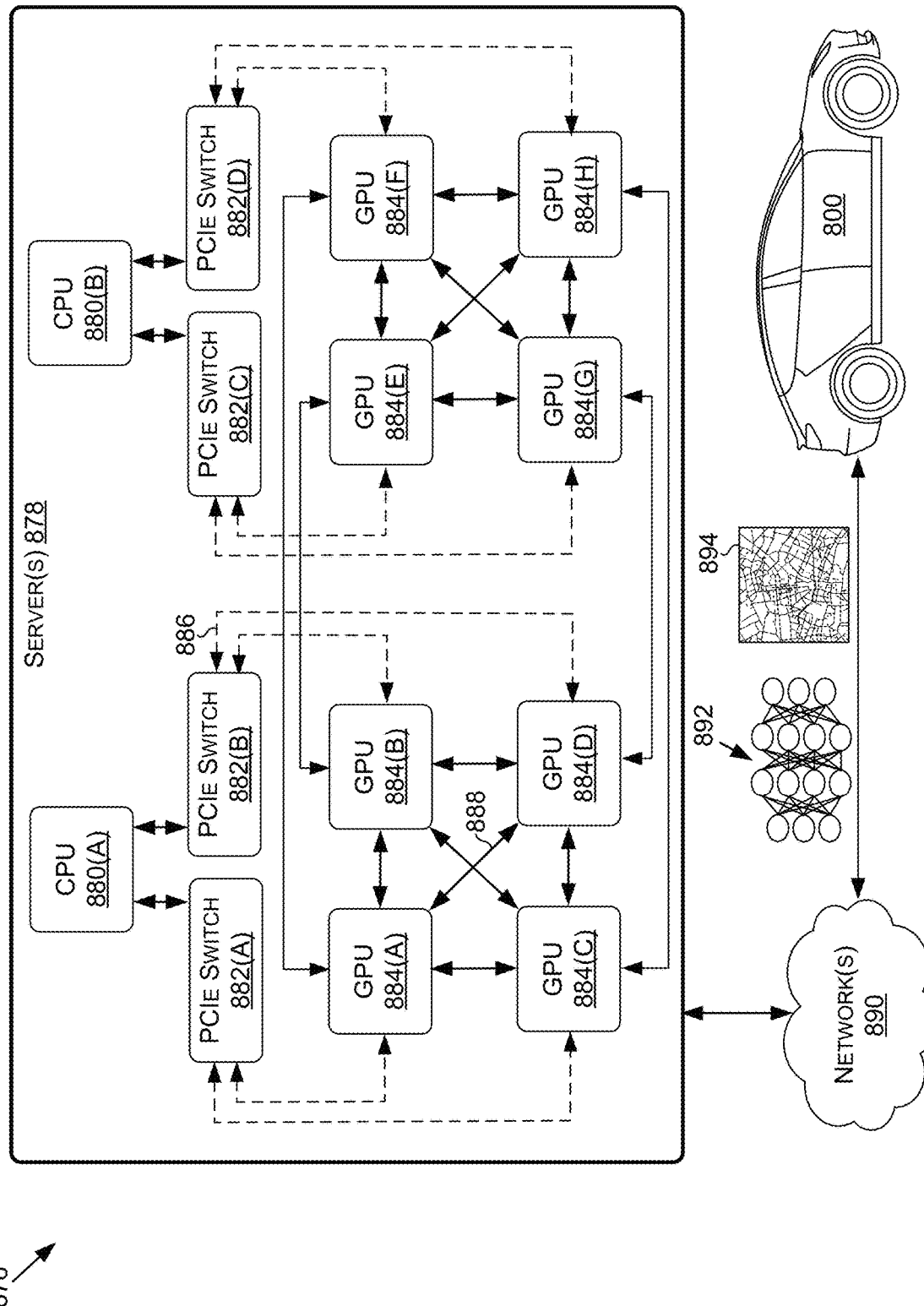
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
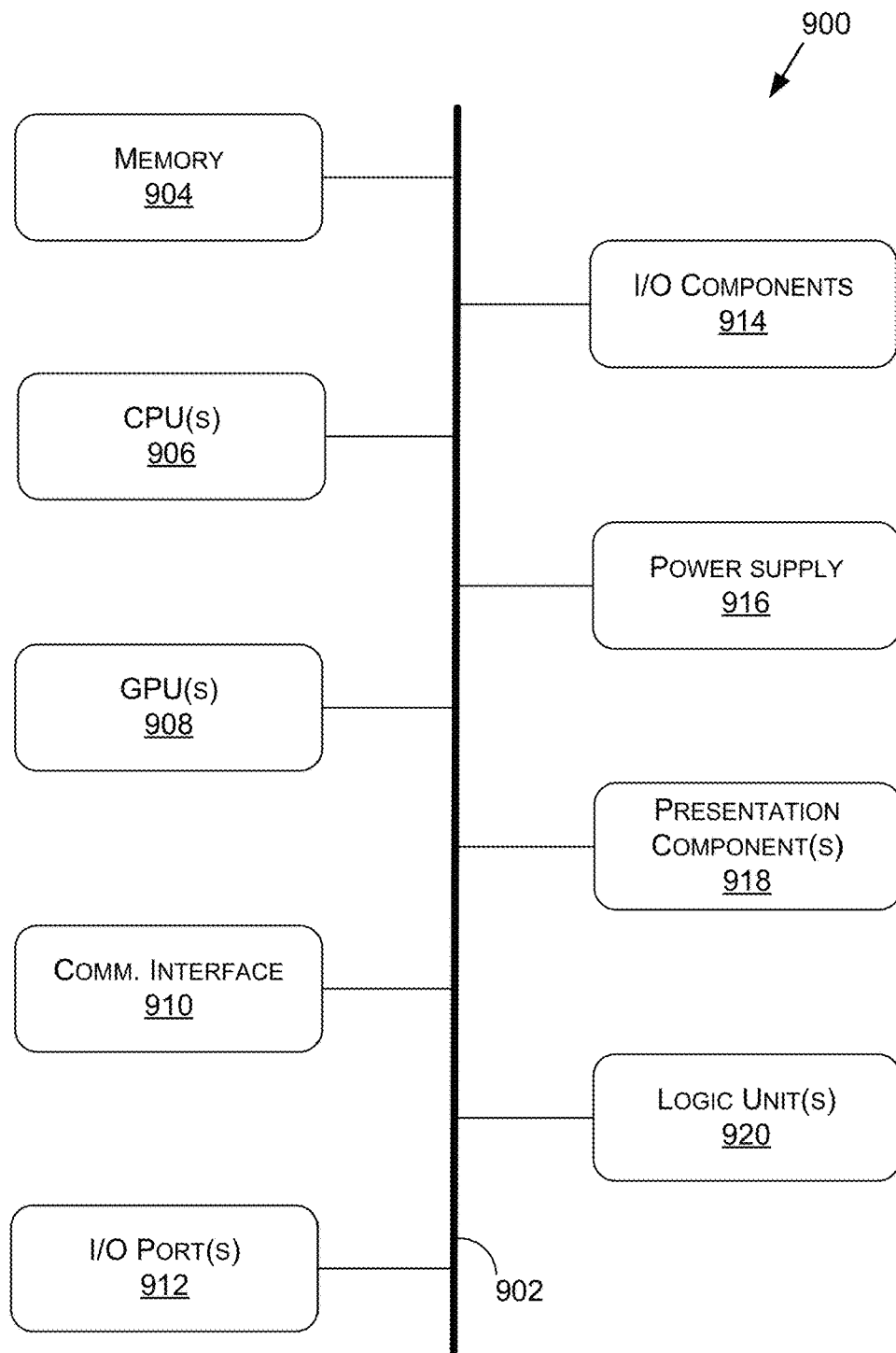
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. For example, one or more aspects of the lens shading calibration system may be performed using a computing device such as computing device(s) 900.

Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof. For example, one or more aspects of the lens shading calibration system may be executed using one or more of the CPUs 906 and/or GPUs 908. In some embodiments, one or more aspects of the lens shading image pre-processor may be executed using one or more of the CPUs 906 and/or GPUs 908.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media. In some embodiments, lens shading calibration parameters such as the radial transfer function parameters 136 and/or the non-radial surface model parameters 146 may be saved to memory 904.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.). In some embodiments, the HMI display 640 comprise at least one of the presentation component(s) 918.

Example Data Center

Figure 10:
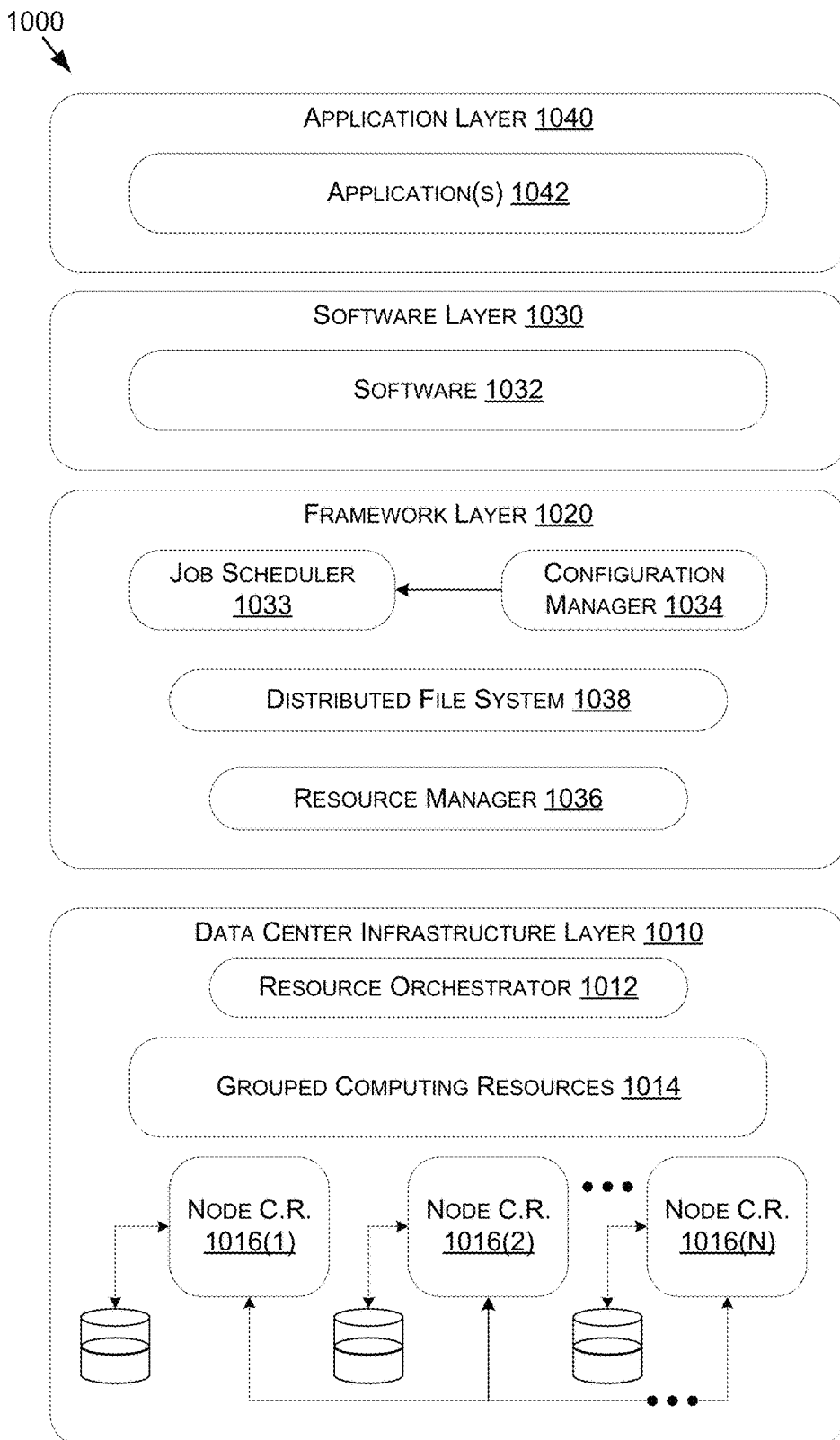
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In some embodiments, lens shading calibration parameters such as the radial transfer function parameters 136 and/or the non-radial surface model parameters 146 may be saved to a node C.R.s 1016 configured as a storage resource. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. In some embodiments, one or more functions of the lens shading calibration system 110 and/or the imaging processing system 610 may be performed using software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
one or more processing units to:
determine a lens shading profile using calibration image sensor data;
determine one or more first parameters for a first lens shading correction based at least on the lens shading profile;
remove a symmetrical component of a lens shading effect based at least on the one or more first parameters;
apply a second lens shading correction to a residual shading profile to produce a calibrated image frame;
compute one or more uniformity values according to at least one uniformity metric using the calibrated image frame; and
based at least on the one or more uniformity values, determine an adjustment to one or more of the one or more first parameters and one or more second parameters.

2. The system of claim 1, the one or more processing units further to:
apply the first lens shading correction to the calibration image sensor data to produce the residual shading profile;
determine the one or more second parameters for a second lens shading correction based at least on the residual shading profile; and
remove a non-symmetrical component of the lens shading effect based at least on the one or more second parameters.

3. The system of claim 2, the one or more processing units further to:
determine a patch array comprising a grid that includes a plurality of control points;
compute a slope corresponding to a rate of change of lens shading at pixels of the lens shading profile corresponding to the plurality of control points;
determine a surface fitting for the patch array based at least on the plurality of control points and the slope at the plurality of control points; and
determine the one or more second parameters for the second lens shading correction based at least on the surface fitting for the patch array.

4. The system of claim 3, the one or more processing units further to:
compute a Bezier surface fitting for the patch array based at least on the plurality of control points and the slope at the plurality of control points.

5. The system of claim 1, wherein the calibration image sensor data comprises a flat-field image.

6. The system of claim 1, wherein the lens shading profile comprises one or more color channels.

7. The system of claim 1, the one or more processing units further to:
generate the lens shading profile as a map of pixels corresponding to pixels of the calibration image sensor data, wherein one or more individual pixels of the map of pixels represent a gain of a lens shading affect occurring in a corresponding pixel of the calibration image sensor data.

8. The system of claim 1, the one or more processing units further to:
determine a plurality of control points on a plurality of radial lines radiating from an optical center of the lens shading profile;
compute a slope corresponding to a rate of change of lens shading at pixels of the lens shading profile corresponding to the plurality of control points;

compute a curve fitting for the plurality of radial lines based at least on the plurality of control points and the slope at the plurality of control points; and determine the one or more first parameters for the first lens shading correction based at least on the curve fitting for the plurality of radial lines.

9. The system of claim 8, the one or more processing units further to:

compute the curve fitting for the plurality of radial lines using a cubic Hermite spline.

10. The system of claim 1, the one or more processing units further to:

perform one or more operations based at least on the one or more first parameters or the one or more second parameters.

11. At least one processor comprising:

one or more processing units to:

determine one or more first parameters for a first lens shading correction based at least on a lens shading profile of a calibration image represented by sensor data;

determine one or more second parameters for a second lens shading correction based at least on a residual shading profile generated based on the first lens shading correction;

perform the first lens shading correction based at least on a plurality of control points on a plurality of radial lines radiating from an optical center of the lens shading profile;

determine a calibrated image frame corresponding to the calibration image based at least on applying the second lens shading correction to the residual shading profile;

compute one or more uniformity values for at least one uniformity metric using the calibrated image frame; and based at least on the one or more uniformity values, determine an adjustment to one or more of the one or more first parameters and the one or more second parameters.

12. The at least one processor of claim 11, the one or more processing units further to:

store a set of lens shading calibration parameters associated with a sensor used to capture the sensor data based at least on the one or more first parameters and the one or more second parameters.

13. The at least one processor of claim 11, the one or more processing units further to:

determine a surface model to perform the second lens shading correction based at least on a plurality of control points on a rectangular patch array applied to the residual shading profile.

14. The at least one processor of claim 11, the one or more processing units further to:

determine the one or more first parameters for one or more color channels of the lens shading profile; and determine the one or more second parameters for one or more color channels of the residual shading profile.

15. A method comprising:

applying a radial lens shading correction to calibration image sensor data;

generating a residual shading profile based at least on the application of the radial lens shading correction to the calibration image sensor data;

applying a non-radial lens shading correction to the residual shading profile;

generating a set of lens shading calibration parameters associated with a sensor module based at least on the application of the non-radial lens shading correction to the residual shading profile; and based at least on one or more uniformity values determined using the calibration image sensor data, determining an adjustment to one or more of the radial lens shading correction or the non-radial lens shading correction.

* * * * *